United States Patent [19]

Shimizu et al.

[11] Patent Number: 5,187,521
[45] Date of Patent: Feb. 16, 1993

[54] MULTICOLOR IMAGE FORMING APPARATUS WITH COLOR COMPONENT DISCRIMINATION FUNCTION

[75] Inventors: Hideaki Shimizu; Masanori Sakai, both of Yokohama, Japan

[73] Assignee: Canon Kabushiki Kaisha, Tokyo, Japan

[21] Appl. No.: 673,239

[22] Filed: Mar. 20, 1991

[30] Foreign Application Priority Data

Mar. 22, 1990 [JP] Japan ............... 2-69673
Mar. 22, 1990 [JP] Japan ............... 2-72644
Mar. 22, 1990 [JP] Japan ............... 2-72647

[51] Int. Cl.$^5$ .......................... G03G 21/00
[52] U.S. Cl. .................. 355/202; 346/157; 355/326; 358/80
[58] Field of Search ........ 355/202, 326, 327, 328; 346/157; 358/75, 80; 118/645

[56] References Cited

U.S. PATENT DOCUMENTS

| 3,690,756 | 9/1972 | Smith | 355/327 |
|---|---|---|---|
| 3,986,771 | 10/1976 | Tsukada | 355/202 |
| 4,380,387 | 4/1983 | Yajima | 355/202 |
| 4,689,696 | 8/1987 | Plummer | 358/333 |
| 4,690,543 | 9/1987 | Watanabe | 355/326 |
| 4,711,553 | 12/1987 | Watanabe | 355/326 X |
| 4,833,505 | 5/1989 | Furuya et al. | 355/326 |
| 4,972,226 | 11/1990 | Kawai | 355/202 |
| 5,032,928 | 7/1991 | Sakai et al. | 358/448 |

FOREIGN PATENT DOCUMENTS 0322680 7/1989 European Pat. Off. .
0365310 4/1990 European Pat. Off. .

OTHER PUBLICATIONS

European Search Report.

Primary Examiner—A. T. Grimley
Assistant Examiner—William J. Royer
Attorney, Agent, or Firm—Fitzpatrick, Cella, Harper & Scinto

[57] ABSTRACT

An image forming apparatus having an exposure unit for exposing an original; a first image forming unit for forming an image on a recording medium by removing an image of first color component(s) from an original image exposed by the exposure unit; a second image forming unit for forming an image on the recording medium by extracting an image of second color component(s) from the original image exposed by the exposure unit; and an image processing unit for making the color distribution range of the first color components to be removed by the first image forming unit consistent with the color distribution range of the second color components to be extracted by the second image forming unit.

18 Claims, 24 Drawing Sheets

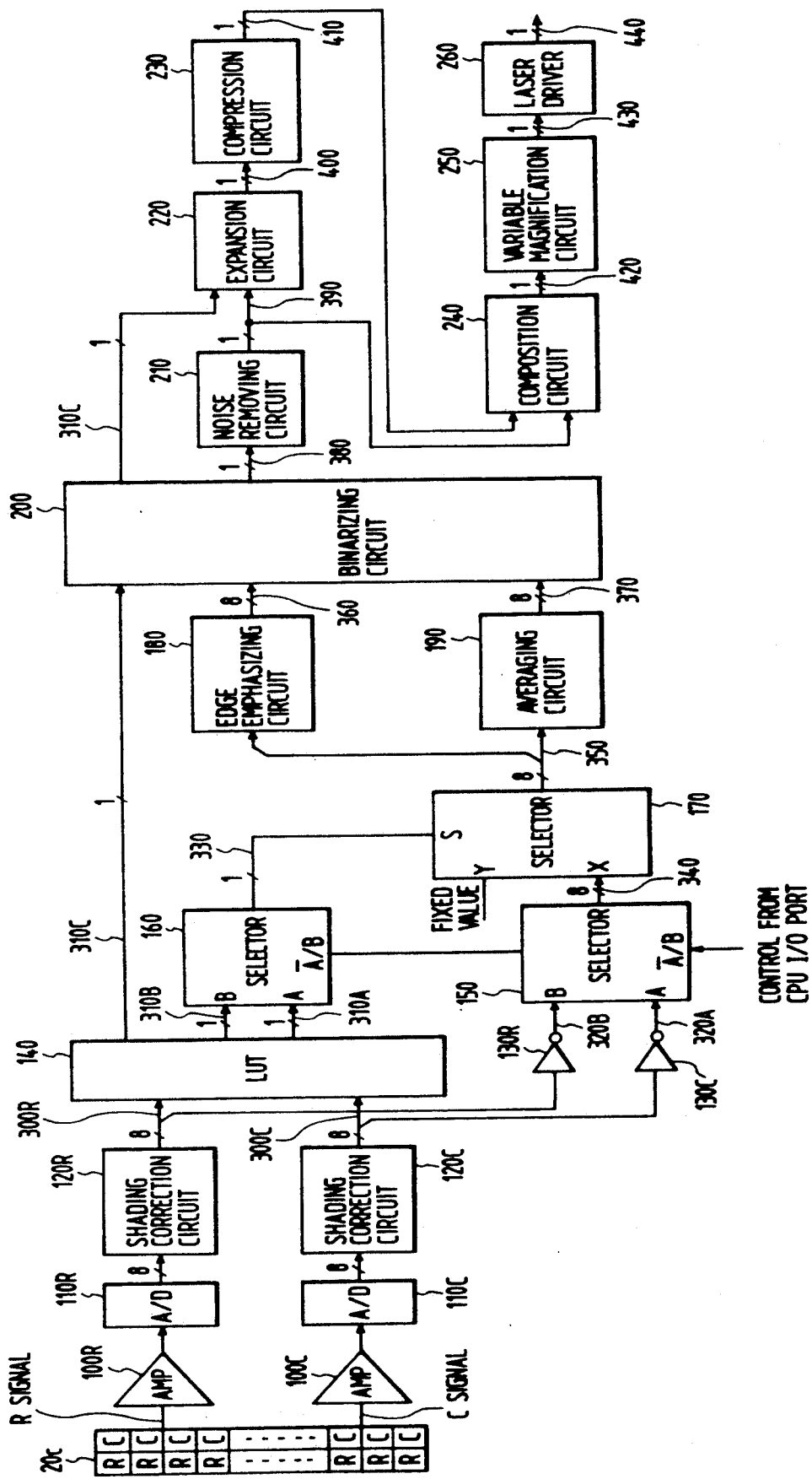

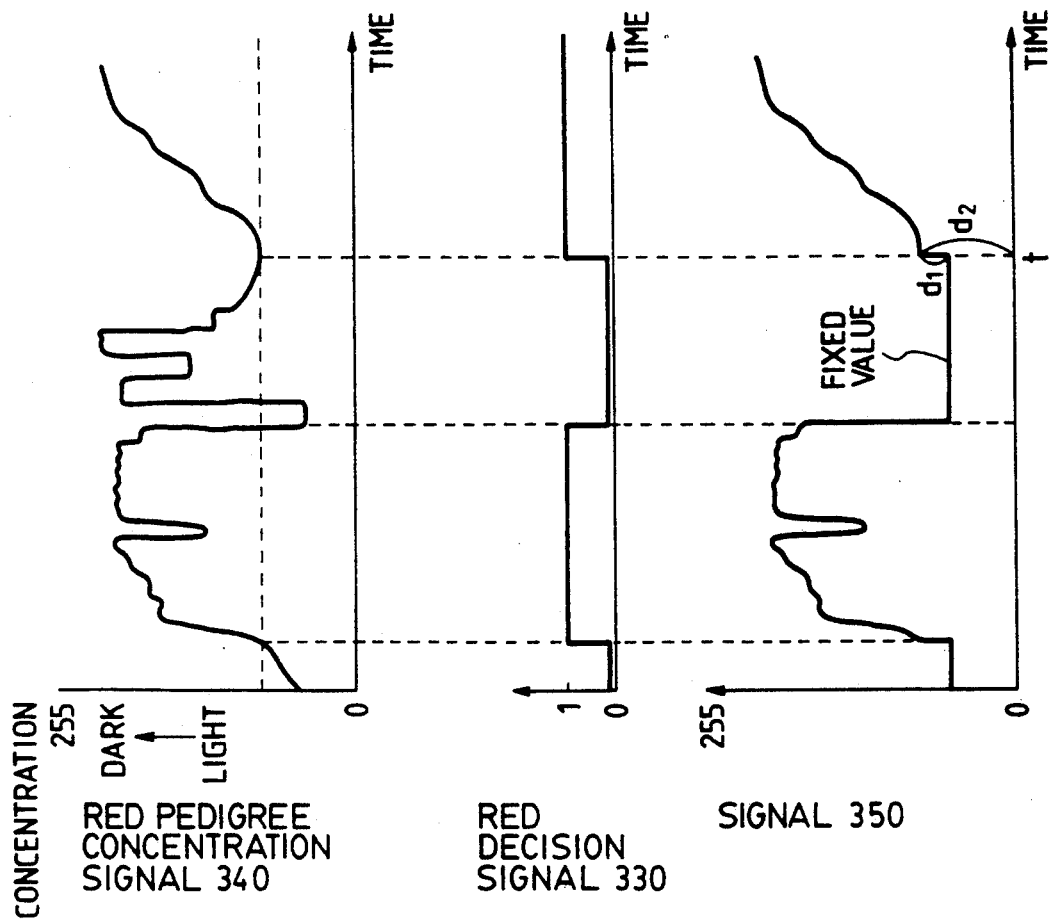

MULTICOLOR IMAGE FORMING APPARATUS WITH COLOR COMPONENT DISCRIMINATION FUNCTION

BACKGROUND OF THE INVENTION

1. Field of the Invention

The present invention relates to an image forming apparatus, and more particularly to an image forming apparatus capable of automatically separating an image of a specific color and forming a superposed multi-color image.

2. Related Background Art

As an image forming apparatus for reproducing an image having the same color as that of an original, there is known a full color copying machine. A full color machine is expensive and requires maintenance. As a more simpler color image forming apparatus, there is disclosed in U.S. Pat. No. 4,711,553 a color copying machine for copying an original image with black, red, blue and the like by recognizing color components of the original such as red and blue.

With this color copying machine, an original image is optically projected onto a photosensitive member. The red component area of the original image is discriminated, and the red component area of a latent image formed on the photosensitive member is erased with a laser beam or the like. Thereafter, the remaining latent image is developed with black toner and transferred to a recording paper. This time, the original image is again optically projected to the photosensitive member. The area other than the red component area of the latent image formed in the photosensitive member is erased with a laser beam. Thereafter, the remaining latent image is developed with a red toner, and transferred to the recording paper in superposition with the image previously transferred. In this manner, the original image is copied using black and red colors.

With the color copying machine of this type, however, a proper two color image cannot be reproduced because it has only poor precision in erasing an area of a latent image of a specific color.

SUMMARY OF THE INVENTION

It is an object of the present invention to provide an improved multi-color image forming apparatus eliminating the above-described disadvantages.

It is another object of the present invention to provide an image forming apparatus and method capable of forming a multi-color image with a simple and low cost system.

It is a further object of the present invention to provide an image forming apparatus and method capable of reproducing a multi-color image with less color aberration.

It is a still further object of the present invention to provide an image forming apparatus and a binarizing method capable of performing a binarization process suitable for a particular image.

It is another object of the present invention to provide an image forming apparatus and method capable of preventing image quality from being lowered as a result of improper duplication of the same superposed images of different colors or of a lost or blank area of both images.

It is a further object of the present invention to provide an image forming apparatus and method capable of forming a multi-color image of good quality by setting the same color distribution range both for the color information removed by an analog image recording system and for the color information removed by a digital image recording system.

The other objects of the present invention will become apparent from the following description and claims when read in conjunction with the accompanying drawings.

BRIEF DESCRIPTION OF THE DRAWINGS

FIG. 10 is a block diagram showing the details of the image processing unit;

FIGS. 13A to 13C are diagrams showing a selection of density signals;

DETAILED DESCRIPTION OF THE PREFERRED EMBODIMENTS

Figure 1:
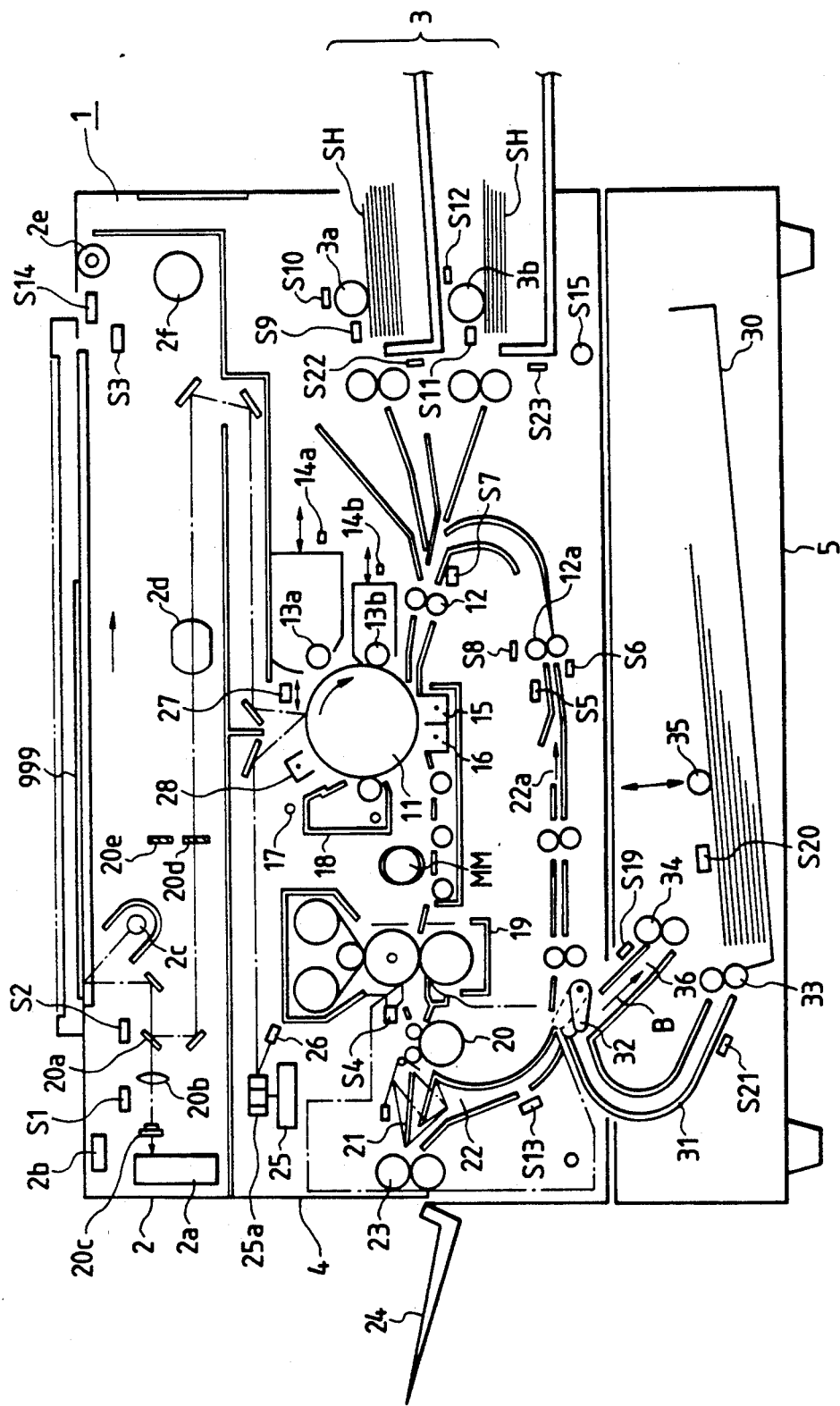
FIG. 1 is a cross sectional view showing the structure of an image recording apparatus according to an embodiment of this invention.

FIG. 1 is a cross sectional view showing an example of the structure of an image recording apparatus according to an embodiment of this invention. In FIG. 1, a copying machine 1 is constructed of an original scanning unit 2, a paper feeder unit 3, an image recording unit 4, an intermediate tray 5, and the like.

First, the structure of the original scanning unit 2 will be described. A controller unit 2a is constructed of a control board or the like, the control board being mounted with control elements for collectively controlling a copy sequence. The controller unit 2a has hardware such as a digital color separation circuit, an image record control circuit, and the like.

Reference numeral 2b represents a power switch. An original exposure lamp 2c together with a scanning mirror constitutes an optical scanning system, the lamp moving to scan at a predetermined speed.

A focusing lens 2d focuses the reflected light from an original to a photosensitive drum 11 of the image recording unit 4 (analog image recording).

A buzzer 2e gives an alarm warming of, for example, a copy mode error originating at an operation unit to be described later. A motor 2f drives the optical scanning system and the like with high precision.

Light transmitted through a half mirror 20a is applied to a focusing lens 20b and is photoelectrically converted into an electrical image signal by a line sensor (reading means) 20c made of a CCD and the like. The electrical image signal is sent to an image processing unit of the controller unit 2a.

Light reflected by the half mirror 20a passes through a red filter 20d for removing red components or a blue filter 20e for removing blue components, or does not pass through any filter, and is focussed via the focused lens 2d on the photosensitive drum 11.

With the image recording apparatus constructed as above, an analog image recording system (constructed of the original exposure lamp 2c, scanning mirror, focusing lens 2d and so on) removes predetermined color components from an original image and forms an image (hereinafter called an analog image) on a recording medium. A digital image recording system (constructed of a semiconduclaser 26, scanner motor 25, laser driver, respectively described later, and so on) extracts predetermined color components from the original image and forms an image (hereinafter called a digital image) on the recording medium, thereby to compose or synthesize the two images.

Analog color separation means (in this embodiment, the red filter 20d for removing red color components, or the blue filter 20e for removing blue color components) focuses an analog image on the photosensitive drum 11 by separating particular color components from an original image obtained by scanning and exposing an original.

An image obtained by scanning and exposing an original is focused via the half mirror 20a and focusing lens 20b on the reading means (in this embodiment, the line sensor 20c having a color separation filter). Digital color separation means (controller unit 2a) analyzes a color separation signal output from the reading means, and outputs predetermined-color record information to be described later to the digital image recording system. The digital image recording system (constructed of the semiconductor laser 26, scanner motor 25, laser driver, and so on) emits a light beam (in this embodiment, a laser beam) in accordance with predetermined-color record information, thereby record a digital image having a designated color on the photosensitive drum 11. The image record controlling means controls the color separation processing by the analog color separation means or digital color separation means, so that a digital image and an analog image can be composed and superposed one upon the other on a recording medium.

The paper feeder unit 3 will be described below.

Reference numerals 3a and 3b represent paper feed rollers which drive cut sheets SH into the image recording unit 4.

Next, the structure of the image recording unit 4 will be described.

Registration rollers 12 temporarily stop a cut sheet SH fed by means of the paper feed roller 3a, 3b to ensure synchronization with the front end of an image and thereafter feed the cut sheet SH.

A developing unit 13a, 13b contains a developing agent (red, black). One of the developing units 13a and 13b is moved near to the photosensitive drum 11, and the other is retracted therefrom, by means of solenoids 14a, 14b.

If a multi-color developing process is carried out (automatic color separation process), the controller unit 2a controls activation of the solenoids 14a and 14b.

A transfer charger 15 transfers a toner image developed by the developing units 13a, 13b to a cut sheet SH which is then peeled off from the photosensitive drum 11 by a separation charger 16. A pre-exposure lamp 17 neutralizes the surface potential of the photosensitive drum 11 for the preparation of a primary charge. A cleaner 18 constructed of a cleaning blade and a cleaning roller recovers residual toner on the photosensitive drum 11.

A fixing unit 19 fixes a toner image transferred to a cut sheet SH by means of heat and pressure. Transport rollers 20 and a flapper 21 change the transport direction of the cut sheet SH after the fixing process to the direction of the intermediate tray unit 5 via paper eject rollers 23 or a trasport path 22. Reference numeral 22a indicates the transport direction.

Reference numeral 24 represents a paper eject tray. A scanner motor 25 rotates a polygonal mirror 25a at a predetermined speed thereby to deflect a laser beam radiated from a semiconductor laser 26. The digital image recording system performs also a process of selectively erasing a latent image formed on the photosensitive drum 11 by applying a laser beam to the latent image area, while an analog image is recorded.

An exposure shutter 27 intercepts a part or all of the reflected image light to inhibit forming of a latent image. Reference numeral 28 represents a primary charger.

Next, the structure of the intermediate tray unit 5 will be described.

An intermediate tray 30 temporarily stores a cut sheet SH transported via transport rollers 34, and the stored cut sheet SH is again transported via a transport path 31 to the image recording unit 4 by means of feeder rollers 33 and 35. References S1 to S15 and S19 to S23 represent sensors. Sensor S1 detects a home position of an optical system of an analog scanning unit. The optical system stops at the home position during a stand-by state. Sensor S2 detects that the optical system has moved to the position corresponding to the front end of an original image. An output of sensor S2 controls the timing of the copy sequence. Sensor S3 detects that the optical system has moved to a limiter position (return position) of the maximum scan. The optical system reciprocally moves by a scan length span determined by a cassette size and magnification entered from the operation unit to be described later. Reference numeral 32 represents a flapper, 36 represents a transport path, and MM represents a main drive motor.

Figure 2:
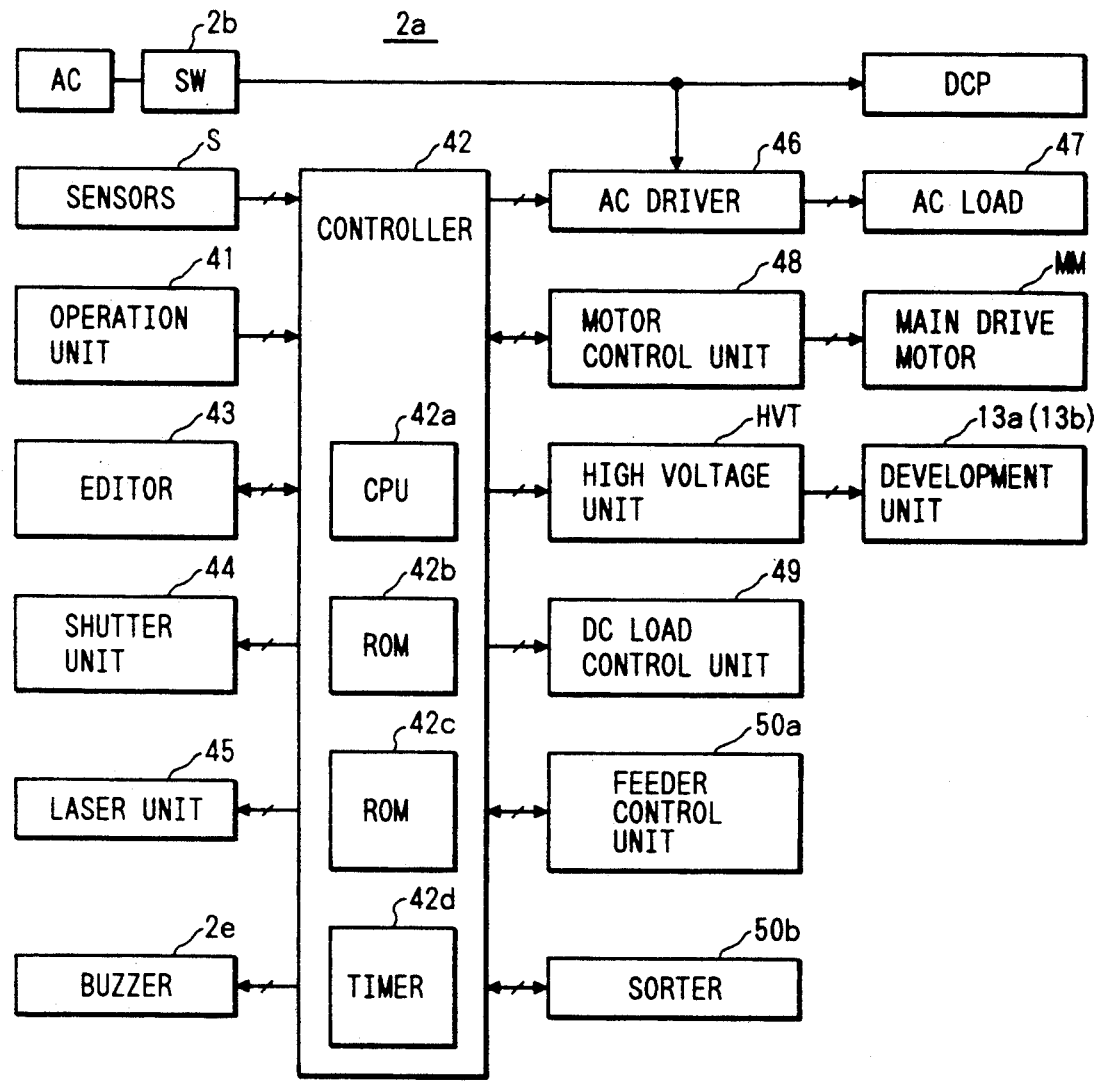
FIG. 2 is a block diagram briefly showing the structure of the image recording apparatus.

FIG. 2 is a block diagram showing the structure of the controller unit 2a shown in FIG. 1. In FIG. 2, like elements to those shown in FIG. 1 are represented by using identical reference numerals.

In FIG. 2, an operation unit 41 has keys for setting copy modes single-side or two-sided copying, superposition, magnification, paper size, and the like).

A controller 42 is constructed of CPU 42a, ROM 42b, RAM 42c, timer 42d, and the like. The controller controls the copy sequence in accordance with the control program stored in ROM 42b.

An editor 43 has keys for entering a desired area of an original, designating various processes for the designated area (masking, add-on processes, and the like), and determining the power of a laser beam for exposing the designated area. A shutter unit 44 is constructed of the exposure shutter 27 and solenoids 14a and 14b.

A laser unit 45 is constructed of the semiconductor laser 26, scanner motor 25, and the like. A motor control unit 48 controls to drive motors. A DC load control unit 49 controls actuation of the solenoids 14a and 14b, clutches, fans and the like. Reference numeral 46 represents an AC driver, and 47 represents an AC load.

A feeder control unit 50a controls to drive an original feeder unit mounted above the original scanning unit 2. A sorter 50b mounted on the image recording unit 5 ejects a cut sheet SH discharged by means of the paper eject rollers 23 into a designated paper eject bin.

HVT represents a high voltage unit for applying a predetermined potential to a charge system and developing sleeves of the developing units 13a and 13b.

DCP represents a DC power source for supplying a control voltage +5 V to the controller unit 2a.

When a power switch 2b is turned on, a heater within the fixing unit 19 is powered. Then, the control stops (wait state) until the fixing rollers take a predetermined temperature which permits the image fixing. When the fixing rollers reach the predetermined temperature, the main drive motor MM is driven for a predetermined period thereby to drive the photosensitive drum 11, fixing unit 19 and the like, and the rollers within the fixing unit 19 are uniformly set to a predetermined temperature (wait release and rotation). Thereafter, the main drive motor MM is stopped and the control is held in a state allowing a copy operation (stand-by state). The main drive motor MM drives the photosensitive drum 11, fixing unit 19, developing units 13a and 13b, and various transfer sheet transport rollers. Upon input of a copy instruction from the operation unit 41, the copy sequence starts.

(1) Description of Image Forming

Upon input of a copy instruction, the main drive motor MM starts rotating, the photosensitive drum 11 starts rotating in the direction indicated by an arrow, and a high voltage is applied to the primary charger 28 from the high voltage unit HVT to generate uniform electric charges to the photosensitive drum 11. Next, the original exposure lamp 2c is turned on, the motor 2f is driven to scan an original on an original plate in the direction indicated by an arrow and project an image of the original to the photosensitive drum 11. In this manner, an electrostatic latent image is formed on the photosensitive drum 11.

Next, the latent image is developed using the developing unit 13a or 13b, and transferred to a cut sheet SH by the transfer charger 15. The cut sheet SH is then peeled off from the photosensitive drum 11 by the separation charger 16.

Next, the resident toner on the photosensitive drum 11 is recovered by the cleaner 18. The photosensitive drum 11 is uniformly discharged by the pre-exposure lamp 17 for the next copy cycle.

At this time, unnecessary electric charges outside of the image forming area are removed by a laser unit constructed of the semiconductor laser 26, rotatable polygonal mirror, and the like.

The laser unit can erase a desired area of an image by applying a laser beam thereto. The laser unit can also superpose a given image upon all original images or on particular images at a desired area of a cut sheet SH. The superposed image is determined in accordance with first and second add-on information entered from the operation unit. The first add-on information includes for example a page number, date, and header, whereas the second add-on information includes for example a legend such as "Important", "Urgent", "Circular", "Copying Prohibited" or "Secret".

One of the developing units 13a and 13b is moved near to the photosensitive drum 11 in accordance with a selection instruction from the operation unit 41.

In this embodiment, the developing unit 13a has black toner, and the developing unit 13b has color toner (e.g. red toner). The developing units 13a and 13b are moved near to or retracted from the photosensitive drum 11 by means of the solenoids 14a and 14b. The developing sleeves of the developing units 13a and 13b are supplied with a developing bias voltage by the high voltage unit HVT.

The image recording apparatus of this embodiment can copy an image not only on one side of a cut sheet but also on both sides thereof, and it can also superpose images. A cut sheet SH once passed through the fixing unit 19 has a different resistance value and the like. In order to deal with this, a high voltage applied to the transfer charger 15 and separation charger 16 is made different between the one side and the other side for two-sided copying and between the first stage and second stages for superposition copying. The developing bias voltage and transer/separation high voltage are controlled by the high voltage unit HVT.

The optical system is reciprocally moved by normally or reversely rotating the motor 2f in accordance with an instruction supplied via the motor control unit 48 from the controller 42.

(2) Control for Cut Sheet SH

Sensors S9 and S11 shown in FIG. 1 detect that the upper and lower cassettes have no cut sheets, and sensors S10 and S12 detect the lifting state of the paper feed rollers 3a and 3b. Sensors S22 and S23 detect the cassette size.

The operations for the upper and lower cassettes are substantially the same, so the operation for the upper cassette only will be described below.

When the upper cassette is inserted, sensor S22 reads the cassette size, a non-paper display of the operation unit 41 is turned off, and a cassette size display is selectively turned on.

Next, when the copy operation starts upon reception of a copy instruction, a middle plate lifting clutch (not shown) is activated to lift up the middle plate of the cassette and hence push up the cut sheets SH. The cut sheet SH becomes in contact with the paper feed roller 3a and raises the roller to a certain height until sensor S10 turns on. Then, the clutch is made inactive, and the paper feed roller 3a is driven to supply a cut sheet SH to the apparatus.

After the cut sheets SH are raised to the certain height by the middle plate lifting plate as described above, this height is held as it is at the start of the following copy operations. However, if the number of cut sheets SH within the cassette descreases during consecutive copy operations and the top surface of the cut sheets SH becomes lower than this height, the clutch is again activated to raise the cut sheets SH to the predetermined height.

A cut sheet SH transported into the apparatus reaches sensor S7. Since the registration rollers 12 are at a stop, the cut sheet SH stops while forming an appropriate loop.

Next, in order to align the front end of an image formed on the photosensitive drum 11 with the front end of the cut sheet SH, the registration rollers 12 are driven in response to a timing signal from sensor S2 to thereby transport the cut sheet SH. After the transfer charger 15 transfers the toner image on the photosensitive drum 11 to the cut sheet SH, the cut sheet SH is peeled off from the photosensitive drum by the separation charger 16, and sent to the fixing unit 19 by the transport mechanism.

At the fixing unit, the surface of the fixing rollers is controlled to a predetermined temperature using temperature sensors (not shown) and heaters disposed near at the peripheries of the fixing rollers. The toner image on the cut sheet SH is fixed, and thereafter the cut sheet SH is detected with sensor S4 and ejected by the paper eject rollers 23.

In the case of a superposition copy, the flapper 21 is moved to the position indicated by two-dot chain lines by means of a solenoid (not shown). A cut sheet SH which has been fed, transferred, and fixed moves along the transport path 22 in the transport direction 22a. After the cut sheet SH is detected with sensor S5, it is aligned in the lateral direction by a lateral registration solenoid upon detection by sensors S6 and S8 and the like.

Upon reception of superposition command from the operation unit 41 or the controller 42, the registration rollers 12a are driven to send the cut sheet SH to the registration rollers 12.

Thereafter, the cut sheet SH undergoes similar operations as described above, and is ejected out into the paper eject tray 24.

In the case of a two-sided copy, a transfer sheet or cut sheet is squeezed by the paper eject rollers 23 in the similar manner as in the case of the one-side copy operation. However, after the back end of the cut sheet SH passes the flapper 21, the paper eject rollers 23 are driven in reverse so that the cut sheet SH is guided by the flapper 21 into the transport path 22.

This reverse drive is carried out by a solenoid which controls to rotate the paper eject rollers 23 normally or in reverse. The following operations are the same as in superposition copying. In this manner, the cut sheet SH is moved partially out of the apparatus by means of the paper eject rollers 23, and upon reverse rotation of them, the cut sheet SH is turned upside down and moved in the transport direction 22a.

The above description has been directed to superposition copying and two-sided copying for a single sheet. In the case of superposition copying and two-sided copying for a plurality of sheets, the intermediate tray unit 5 is used. As shown in FIG. 1, the intermediate tray unit 5 has an intermediate tray 30 for temporarily storing a plurality of cut sheets SH. In the case of superposition copying for a plurality of sheets, a fixed cut sheet SH is moved partially out of the apparatus by means of the paper eject rollers 23 and thereafter, by driving the paper eject rollers 23 in reverse in the similar manner discussed with the case of two-sided copying for a single sheet, transported into the intermediate tray 30 via the transport path 22, flapper 32, and transport path 36.

The above operations are repeated to store all cut sheets SH with a first image formed thereon. Upon the next copy command, the feeder rollers 33 are driven to feed the cut sheet SH sequentially to the transport path 31 and execute copying a second image.

In the case of two-sided copying for a plurality of sheets, with the same control as in the case of superposition copying for a single sheet, a cut sheet SH is transported from the fixing unit 19 into the intermediate tray 30 via the flapper 21, transport paths 22 and 36.

The succeeding operations are the same as those for superposition copying, so the description thereof is omitted.

Figure 3:
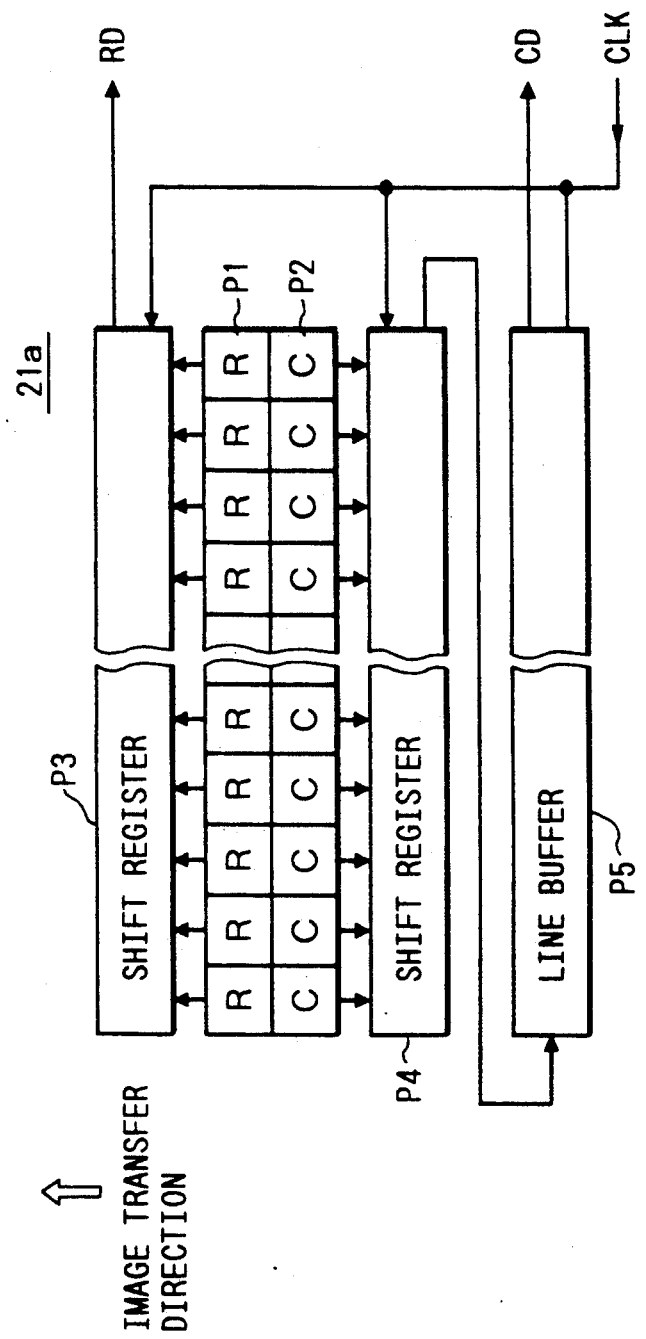
FIG. 3 is a block diagram showing the structure of the line sensor.

FIG. 3 is a block diagram showing the structure of the line sensor 20c shown in FIG. 1. P1 and P2 represent a line sensor with a color separation filter. The line sensor P1 is equipped with an optical red color filter, and the line sensor P2 is equipped with an optical cyan filter.

P3 and P4 represent a shift register. The shift register P3 outputs as a red color signal RD the charges stored in the line sensor P1 to the image processing means of the controller unit 2a, in synchronism with a shift clock CLK. The shift register P4 outputs as a cyan color signal CD the charges stored in the line sensor P2 to the image processing means of the controller unit 2a, in synchronism with the shift clock CLK. P5 represents a line buffer.

The image record processing by the image recording apparatus of this invention will be described below with reference to FIGS. 4 to 6.

For the normal image recording, the optical filter (red filter) 20d and optical filter (cyan filter) 20e are not used in forming a latent image on the photosensitive drum 11. In this case, the semiconductor laser 26 can apply a laser beam to a desired area of an image to erase a part of the image. If a red pedigree color erase mode is designated by the operation unit 41, the optical filter 20d is set within the optical path of a reflected light from an original, by driving the filter by a solenoid and the like, and the red pedigree color of the original image is removed for image recording. Similarly, if a blue pedigree color erase mode is designated by the operation unit 41, the optical filter 20e is set within the optical path of a reflected light from an original, by driving the filter by a solenoid and the like, and the blue pedigree color of the original image is removed for image recording.

The red pedigree color separation processing and blue pedigree color separation processing for the automatic digital color separation processing will be described.

To realize automatic color separation, transmission light from the half mirror 20a is focused to the line sensor shown in FIG. 3 to read the original image. The electric charges for all pixels stored in the line sensors P1 and P2 having a color separation filter are transferred at a time to the shift registers P3 and P4, shifted in synchronism with the shift clock CLK, and output as a red color signal RD to the image processing means of the controller unit 2a.

The line sensor P2 for outputting the cyan signal CD is disposed at an image read position one line earlier in the direction indicated by the arrow (in the paper feed direction). Therefore, the output of the shift register is delayed by the line buffer P5 to compensate the one line lead so that the cyan signal CD can take the same phase as that of the red color signal RD.

Figure 4:
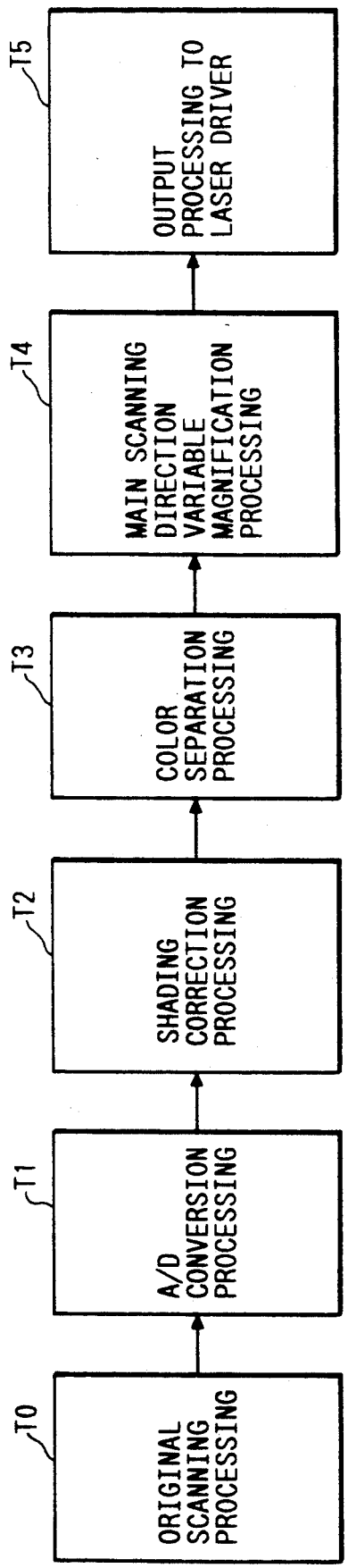
FIG. 4 is a schematic diagram illustrating the image processing process by the controller unit.

FIG. 4 is a schematic diagram used for explaining the image processing by the controller unit 2a shown in FIG. 1. T0 to T5 represent the flow steps.

As the original scan process starts (T0), the red color signal RD and cyan signal CD are output from the line sensor 20c. Next, the red color signal RD and cyan signal CD are A/D converted (T1) into a digital image signal.

Next, the outputs of each pixel from the line sensor 20c are subjected to shading correction processing in accordance with previously stored shading data (T2), and the color separation process (which follows the flow chart shown in FIG. 5) starts to form a color image record signal which becomes a color area signal (T3).

Then, variable magnification processing in the main scanning direction is executed in accordance with a set magnification factor (T4). Thereafter, the color image record signal is outputted to the laser driver (T5). As a result, the semiconductor laser 26 radiates a laser beam modulated by the color image record signal to the photosensitive drum 11 to record the image. At this time, it is necessary to intercept light from the analog image recording system by means of the shutter 27.

Next, the color separation processing will be described with reference to FIG. 5.

Figure 5:
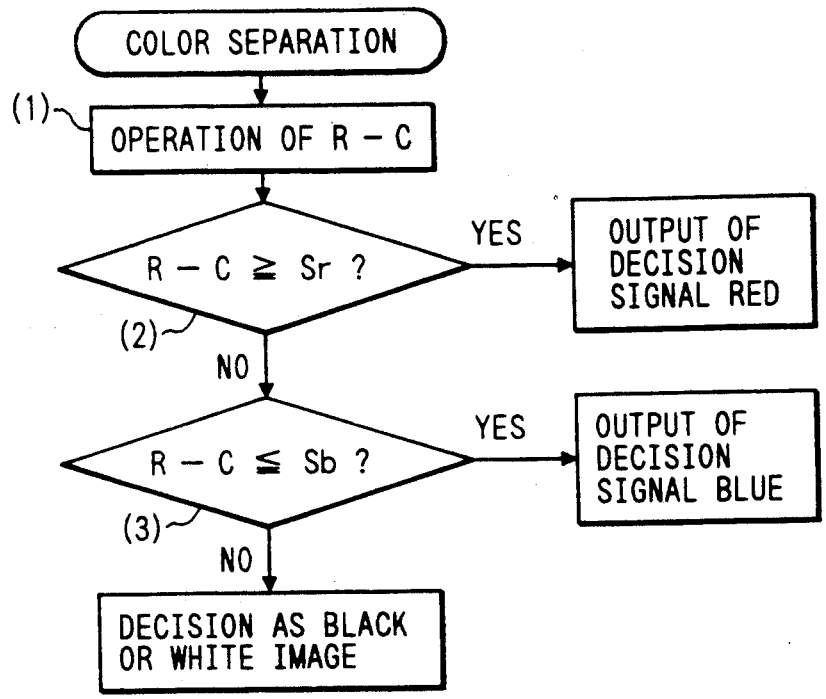
FIG. 5 is a flow chart showing an example of color separation processing for an analog image by the image recording apparatus of this invention.

FIG. 5 is a flow chart used for explaining an example of the digital color separation processing by the image recording apparatus of this invention. (1) to (3) represent the flow steps.

First, the difference (R−C) between the shading corrected red data R and cyan data C is calculated (step 1). It is checked if the difference is equal to or larger than a slice level Sr for discriminating the red color (step 2). If affirmative, a decision signal RED is output, and if negative it is checked if the difference is equal to or larger than a slice level Sb for discriminating the blue color (step 3). If affirmative, a decision signal BLUE is output, and if negative, it is judged either as a black image or a white image.

Next, the image composition processing by the image processing apparatus of this invention will be described with reference to FIGS. 6 and 7.

Figure 6:
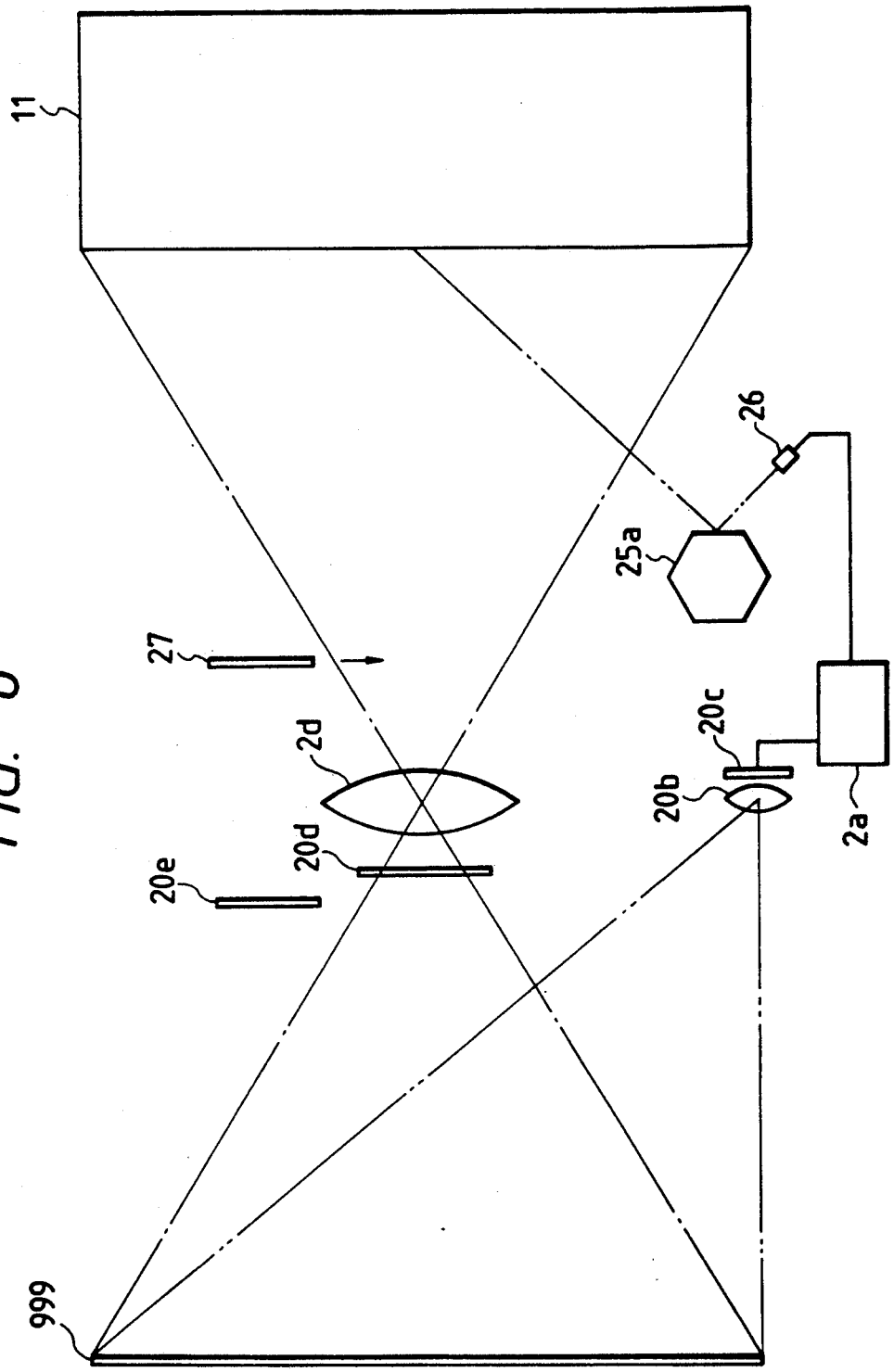
FIG. 6 is a schematic diagram showing the image composition principle at the digital image recording system and analog image recording system of the image recording apparatus of this invention.

FIG. 6 is a schematic diagram explaining the image composing (or synthesis) principle used by the digital image recording system and analog image recording system of the image recording apparatus of this invention. In FIG. 6, like elements to those shown in FIG. 1 are represented by identical reference numerals.

In FIG. 6, reference numeral 999 represents an original which is assumed to have, for example, a stamp "Circular" in red color at a desired area.

Figure 7:
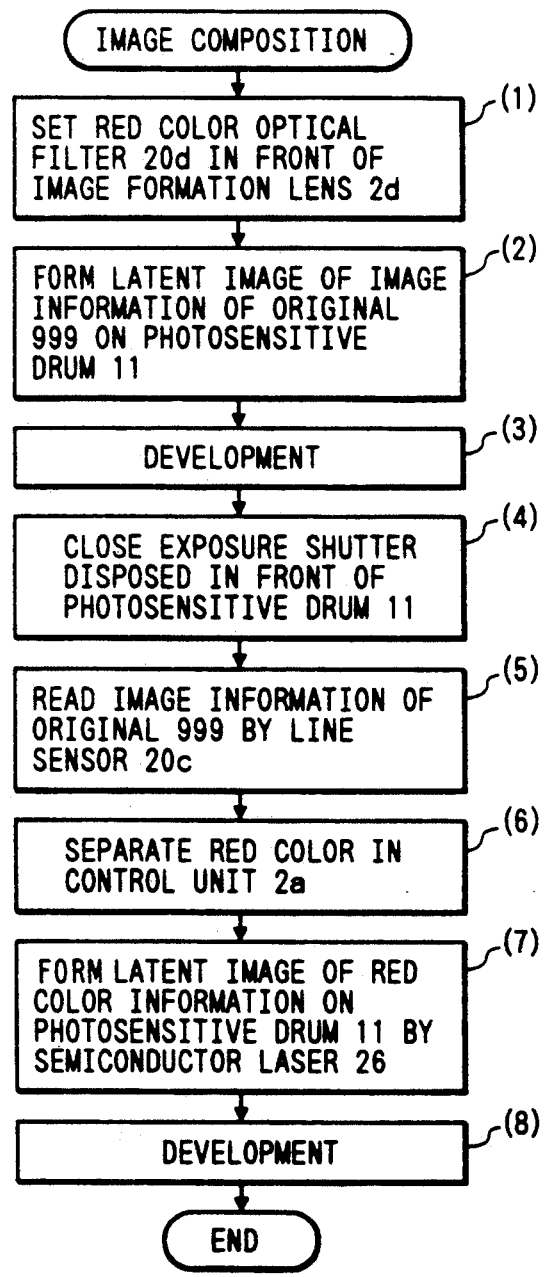
FIG. 7 is a flow chart showing an example of a procedure of image composition by the image recording apparatus of this invention.

FIG. 7 is a flow chart used for explaining an example of the image composition processing by the image recording apparatus of this invention. (1) to (8) represent the flow steps.

In order to remove the red image in the original 999 (in order to separate the red image from the black image in the original 999), the optical filter 20d is set in front of the focusing lens 2d (step 1). Next, the original 999 is illuminated with the original exposure lamp 2c, and the reflected light therefrom is guided to the optical filter 20d. As a result, only the red image information in the original 999 is removed. The remaining image information passes through the focusing lens 2d, and is focused on the photosensitive drum 11 so that there is formed a latent image corresponding to an image with the red image removed therefrom (step 2). The latent image without the red image is developed into black by the developing unit 13a (step 3). Next, the developed black image is transferred to a conveyed cut sheet SH which is then peeled off by the separation charger 16. Thereafter, a toner image is fixed by the fixing unit 19 through thermal pressure.

In the above manner, the cut sheet SH with the black image information being recorded is transported via the flappers 21 and 32 and the transport path 22 to the registration rollers 12a for the preparation of the next image recording.

In order to prepare for the next, red image recording (digital image recording), the exposure shutter 27 disposed in front of the photosensitive drum 11 is closed (step 4), so that light from the exposure lamp 2c will not be focused on the photosensitive drum 11.

Next, the original 999 is illuminated with the original exposure lamp 2c, and the reflected light is transmitted through the half mirror 20a and is focused on the line sensor 20c (step 5). The electrical information photoelectrically converted by the line sensor 20c is then supplied to the controller unit 2a to separate the red color (step 6). The separated red image information is applied as red color record information to the laser driver (not shown) so that the semiconductor laser 26 generates a laser beam modulated by the red color information, the laser beam being scanned by the polygonal mirror to form a red color latent image on the photosensitive drum (step 7). Next, the latent image is developed into red by the developing unit 13b and transferred to the cut sheet SH has been transported back again. The image transferred cut sheet SH is peeled off by the separation charger 16, and the transferred image is fixed by the fixing unit 19.

The cut sheet SH having the composed black and red image information is ejected out via the flapper 21 to the paper eject tray 24.

If the color of a color separation filter is selected in accordance with the developing color of the developing unit 13b, an image having color components corresponding to the developing color can be composed with an analog image. The record color is not therefore limited to red, blue and black described above.

Figure 8:
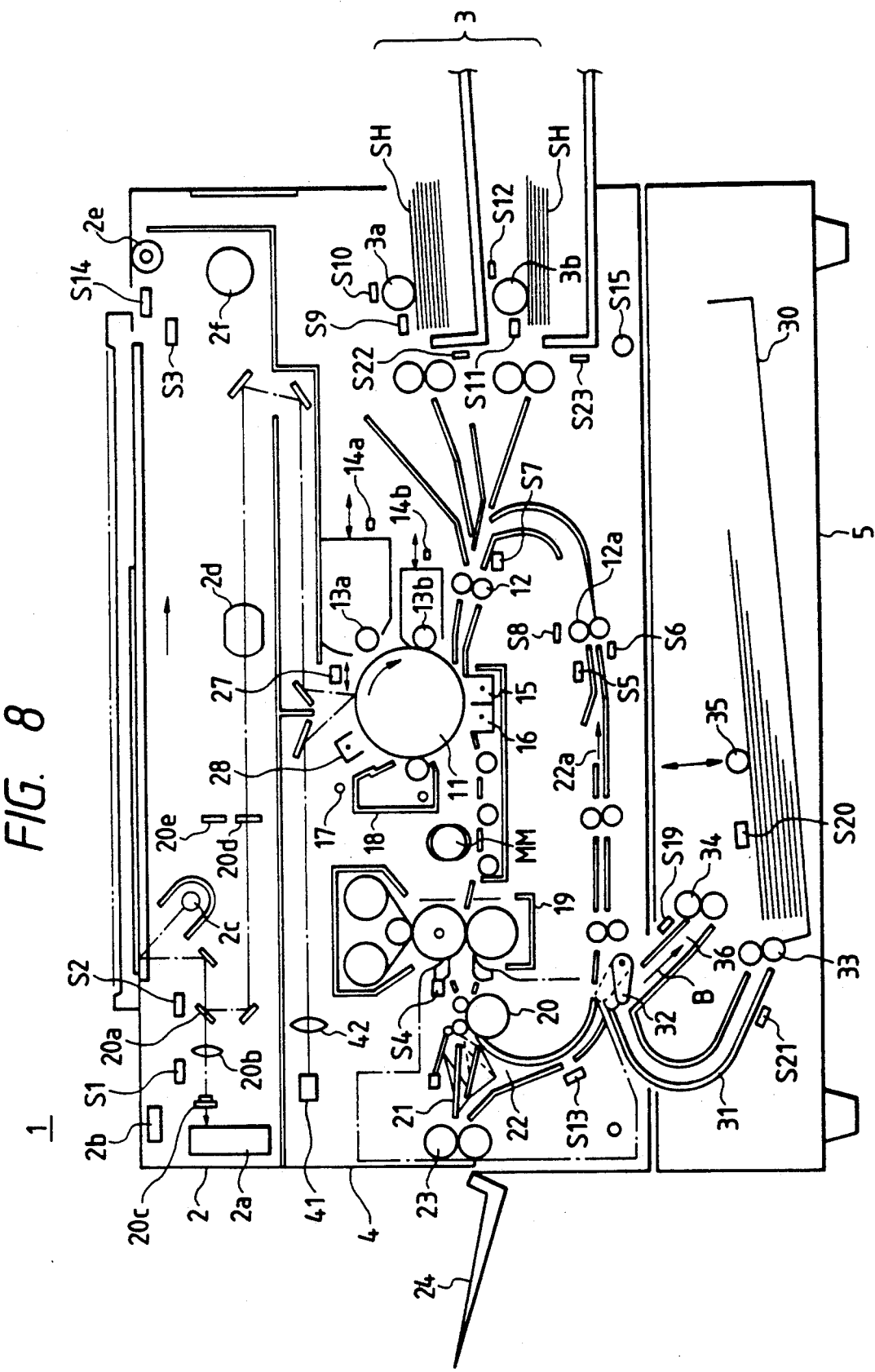
FIG. 8 is a cross sectional view of the image recording apparatus according to another embodiment of this invention.

In the above embodiment, a digital latent image has been formed on the photosensitive drum 11 using the semiconductor laser 26 constituting the digital image recording system. A digital image may also be recorded using a digital image recording system constructed of an LED array 41, a focusing lens 42, and the like as shown in FIG. 8, thereby making the smaller system. A digital image recording system may also be of the type that exposure is carried out while the LED is in tight contact with the photosensitive drum 11.

Furthermore, in the color separation processing by the image processing means, the red and blue color discrimination processing has been executed using the output of the line sensor 20c having two red and cyan color separation filters. The red and blue color discrimination processing may be carried out by multiplying the ratio between the red data R and cyan data C by a constant k and comparing the resultant value with the slice levels Sr and Sb, as shown in FIG. 9.

Figure 9:
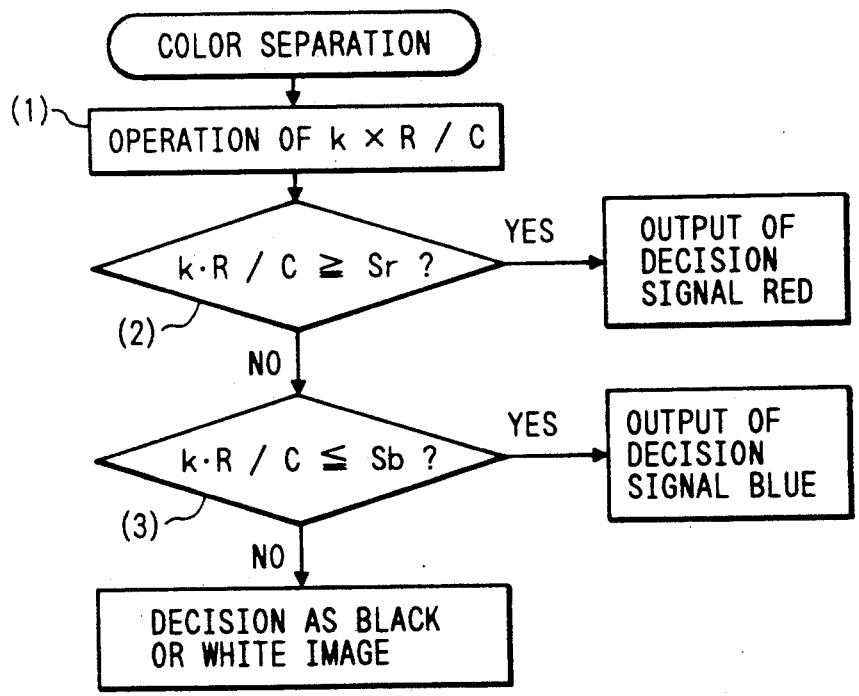
FIG. 9 is a flow chart showing another example of color separation processing for an analog image by the image recording apparatus of this invention.

FIG. 9 is a flow chart used for explaining an example of another digital color separation processing by the image recording apparatus of this invention. (1) to (3) represent the flow steps.

First, the ratio (R/C) between the shading corrected red data R and cyan data C is multiplied by a constant k (step 1). It is checked if the resultant value is equal to or larger than a slice level Sr for discriminating the red color (step 2). If affirmative, a decision signal RED is output, and if negative it is checked if the resultant value is equal to or larger than a slice level Sb for discriminating the blue color (step 3). If affirmative, a decision signal BLUE is output, and if negative, it is judged either as a black image or a white image.

Color separation may be made using a combination of red (R) and blue (B), or red (R) and green (G).

As described above, a color image of a certain color tone contained in an original image is converted into a binarized image which is then composed (synthesized) with an image formed by the analog image recording system. Therefore, it is more cost effective than synthesis of a multi-value image. Furthermore, various image composition processing can be realized using a combination of stamping function, add-on function, framing function, and blanking function, respectively specific to the digital image recording system.

Still further, the digital image recording system described above has a function of erasing a background image when exposing the latent image area already formed by the analog image recording system, and has an add-on function when exposing the area without forming a latent image.

The digital color separation processing may be carried out by software of the controller unit 2a as described above, or by hardware using a look-up table (LUT) or the like.

The above-described reading means has used two CCD line sensors. Instead of this, a mosaic type sensor having R, C, R, C, . . . alternately disposed for each pixel may be used.

Further, in the above embodiment, this invention has been applied to an electronic photograph type color printer. This invention is also applicable to a Cycolor (Registered Trademark, Meed Corporation), that is, not only to the type where a background image is formed on a photosensitive medium, but also to an image recording apparatus of the type an image is directly exposed to a specific recording medium.

At the stage of removing a desired color image using an optical filter, the removal characteristics change with the color in question. In general, the distribution range of blue pedigree color components removable by a cyan filter is very narrow as compared with that of red pedigree color components removable by a red filter.

The color distribution range when desired color components are extracted from an image signal read with a sensor is broader than that obtained using an optical filter. In this case, however, the color distribution range changes also with the characteristics of an image forming medium (photosensitive member) or the like.

The important factor is therefore a difference of the color distribution ranges of desired color removal and extraction between the two image forming systems. Specifically, if the color distribution range for color removal is narrower than that for color extraction, a superposed image made from single original have both an image not removed and an image extracted, thereby resulting in an image having a duplicated area. On the other hand, if the color distribution range for color removal is broader than that for color extraction, there is formed an image having a blank area.

Furthermore, if image information is binarized using a fixed slice level in the digital image recording system, there arise problems that open spaces in a small character are painted in or crushed, and a color area with low density is incorrectly judged as white.

A method of eliminating a duplicated image area or a blank image area and a proper binarizing method will be described.

FIG. 10 is a block diagram showing the details of the controller unit 2a.

As shown in FIG. 10, the R and C signals from the CCD line sensor 20c are input to amplifiers 100R and 100C, respectively. The amplifiers 100R and 100C amplify the R and C signals respectively such that the outputs of the amplifiers when the CCD line sensor 20c reads a white plate (not shown) at the original scanning unit 2 correspond to the full scales of A/D converters 110R and 110C, respectively.

Next, the analog signals amplified by the amplifiers 100R and 100C are A/D converted into 8 bit digital information by the next stage A/D converters 110R and 110C, respectively. The outputs from the A/D converters 110R and 110C are input to the shading circuits 120R and 120C, respectively. The shading circuits 120R and 120C correct the sensitivity dispersion of the CCD line sensor 20c, the light amount dispersion of the original exposure lamp 2c, and the like. The outputs of the shading circuits 120R and 120C are input to a look-up table (LUT) 140, and to inverters 130R and 130C, respectively.

LUT 140 outputs color decision signals 310A, 310B and 310C, in accordance with the supplied red pedigree color digital information 300R (8 bit, 256 tones) and blue pedigree (cyan) digital information 300C (8 bit, 256 tones). The color discrimination using LUT 140 is illustrated in FIGS. 11 and 12.

Figure 11:
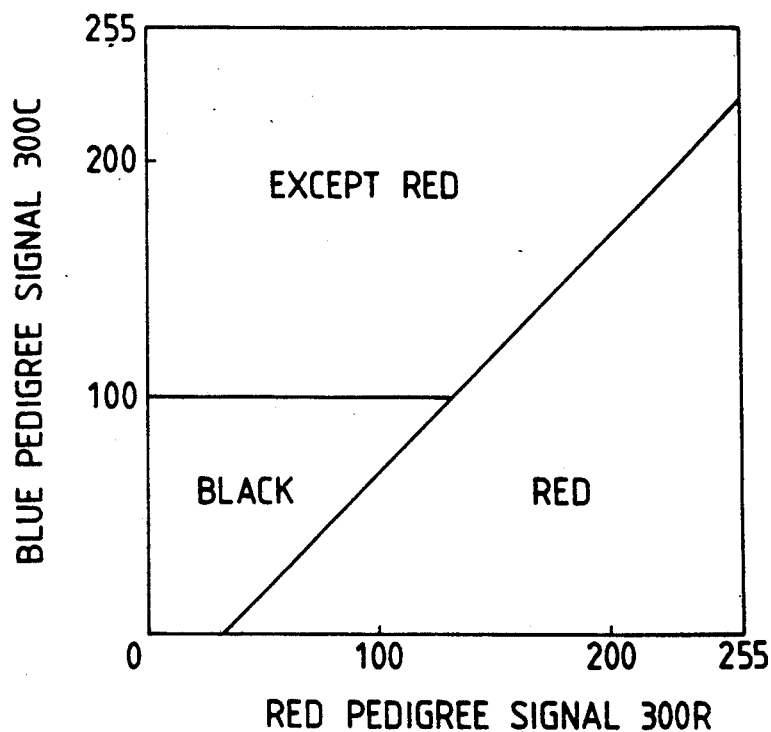
FIGS. 11 and 12 are diagrams used for explaining color discrimination of an image.

FIG. 11 shows a LUT for generating the red decision signal 310A and black decision signal 310C. Similarly, FIG. 12 shows a LUT for generating the blue decision signal 310B and black decision signal 310C. For example, if the red signal 300R takes a level "200" and the blue signal 300C takes a level "100", then this color is within the red region, so that the red decision signal 310A takes a value "1". In the case of LUT shown in FIG. 12, the color is outside of the blue region, so the blue decision signal 310B takes a value "0".

Figure 12:
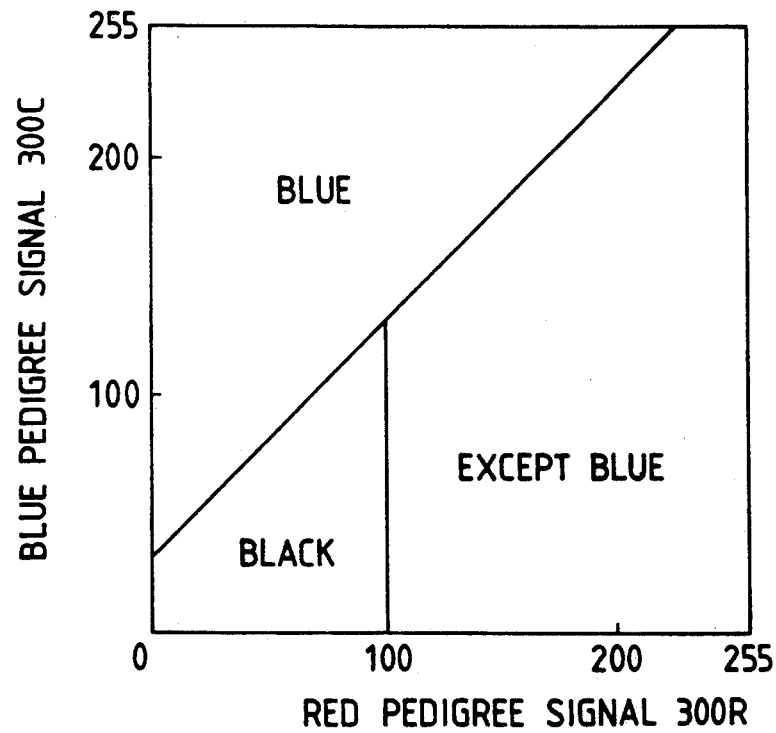

LUT shown in FIG. 11 is used for discrimination between red and black of a red and black two color print, whereas LUT shown in FIG. 12 is used for discrimination between blue and black of a blue and black two color print. The contents of LUT, particularly, the borders between colors, are not limited to those shown in FIGS. 11 and 12.

For example, in FIG. 11, if the region for red is made large, the range of color hues decided as red will be broadened. Therefore, a plurality of tables having different borders may be selectively used by a user.

Figure 24:
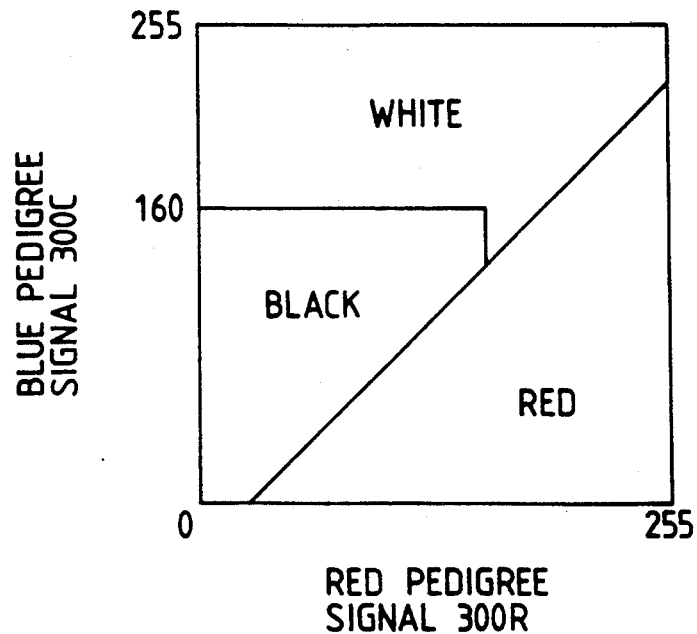
FIGS. 24 and 25 are diagrams showing color discrimination according to the second embodiment.
Figure 25:
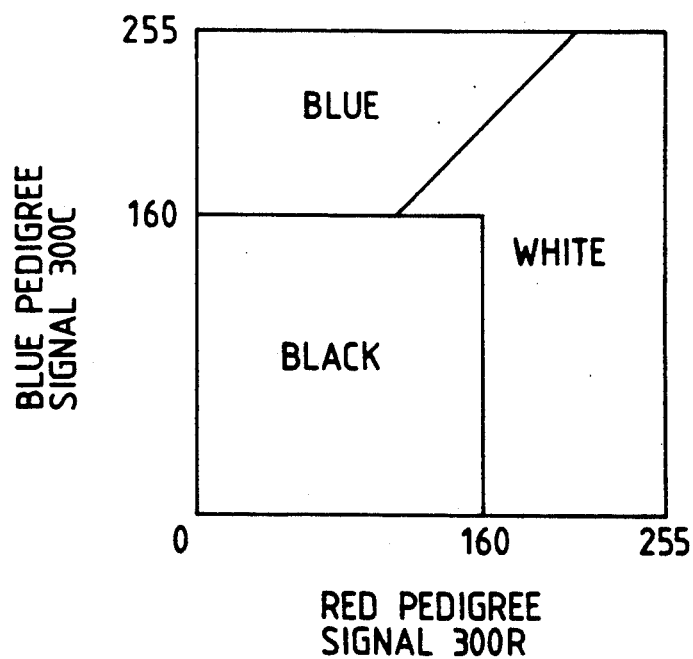

The borders set in the tables shown in FIGS. 11 and 12 are determined so as to be consistent with the distribution range of color information removable by the optical filter 20d, 20e. In general, the distribution range of blue pedigree color removable by a cyan filter is narrower than by a red filter. Therefore, in order that the distribution range of color information removable by an optical filter is consistent with that digitally extracted, tables are constructed as shown in FIGS. 24 and 25. Namely, the region decided as red in FIG. 24 is made narrower than that decided as blue in FIG. 25.

The black decision signal 310C is input to a binarizing circuit 200. The red signal 300R and cyan signal 300C are inverted by the inverters 130R and 130C, respectively, to become signals 320B and 320A. This signal 320B is an inverted signal of the red luminance signal 300R so that it is a cyan density signal. The signal 320A is an inverted signal of the cyan luminance signal 300C so that it is a red density signal.

Selectors 150 and 160 shown in FIG. 10 are controlled by signals from an I/O port (not shown) of CPU 42a. The control line of the selectors is set to "0" for red pedigree color separation, and to "1" for blue pedigree color separation. Namely, if red pedigree color separation is selected, the signal 310A is selected and outputted as a signal 330, and the signal 320A is selected and output as a signal 340.

The following detailed description will be directed to the case of red pedigree color separation, i.e., to the case where the control lines of the selectors 150 and 160 are set to "0".

The red pedigree density signal selected by the selector 150 is input to an x terminal of the selector 170, a y terminal being input with a fixed value (in this embodiment, "32"). The red region signal 330 is input to a control terminal S of the selector 170. The selector 170 selects, as shown in FIGS. 13A to 13C, for example, the red pedigree density signal 340 if the signal "1" is input to the controls terminal S, and the fixed value if "0".

The reason why the fixed constant value not "0" is selected if the red region signal 330 is "0" is as follows.

If the red pedigree density signal 340 is made "0" and the read image signal is decided as not red, the signal 350 for example shown in FIG. 13C has a density difference d2 before and after time t, so that the density difference becomes larger than a density difference d1 when a constant not "0" is used. As a result, even a gentle area which is originally not an edge area will have an emphasized border before and after the time t by operation of an edge emphasizing circuit 180 to be described later, resulting in a poor image quality. This problem is solved by setting as the fixed value a positive constant not "0". The fixed value is not limited to "32", and it may use a different value between red and blue pedigree color processing. Alternatively, one of a plurality of fixed values may be selected in accordance with a user preference.

Figure 26:
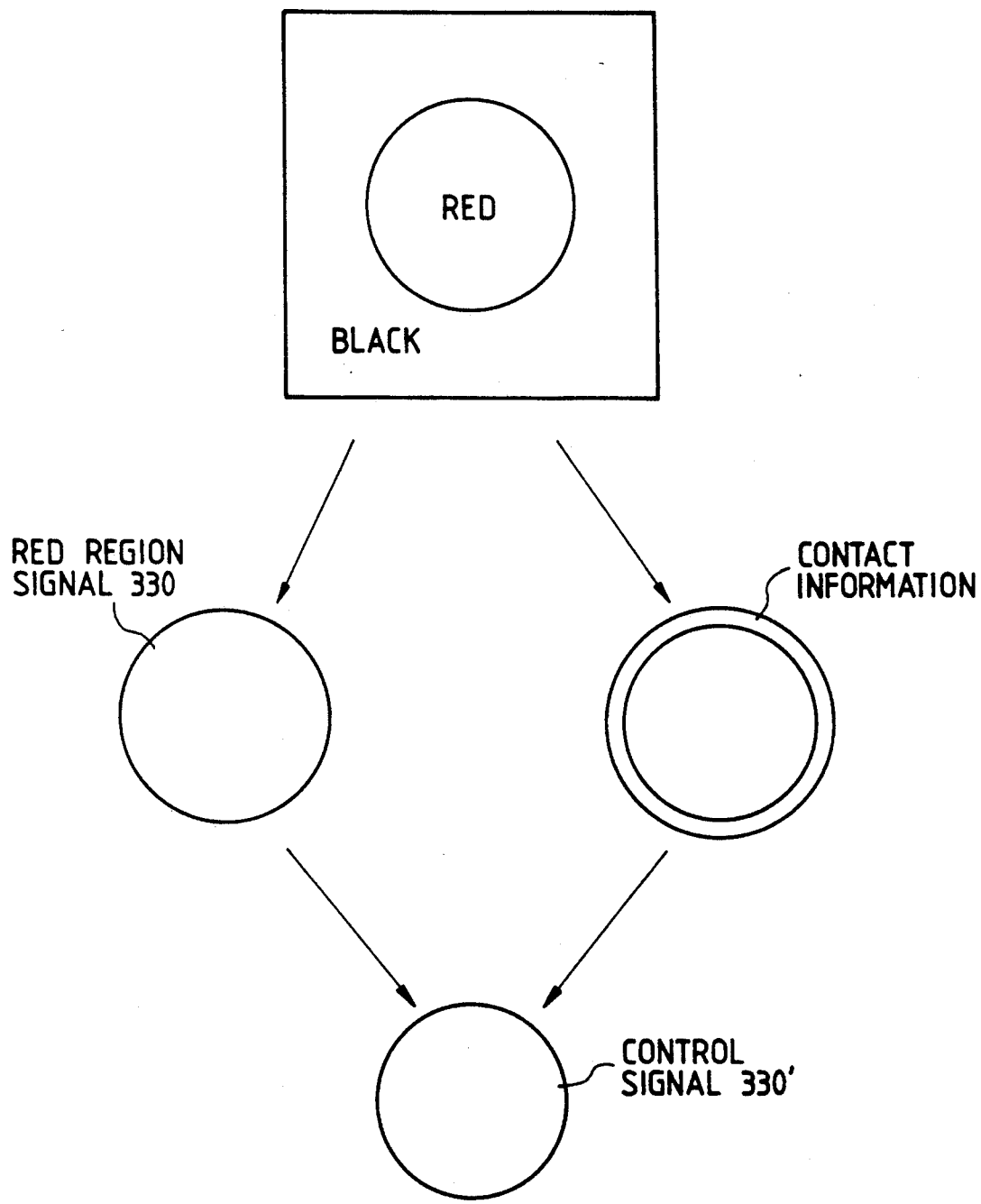
FIGS. 26 to 28 are diagrams used for explaining contact extraction.

FIG. 26 is a schematic view showing a black image containing a red circle image, and illustrating the extraction of the red region signal 330 representative of the red region, and contact information representative of the contact area between the red image and black image. An AND product of the red region signal 330 and an inverted signal of the contact information becomes a control signal 330' to be input to the S terminal of the selector 170.

Figure 27:
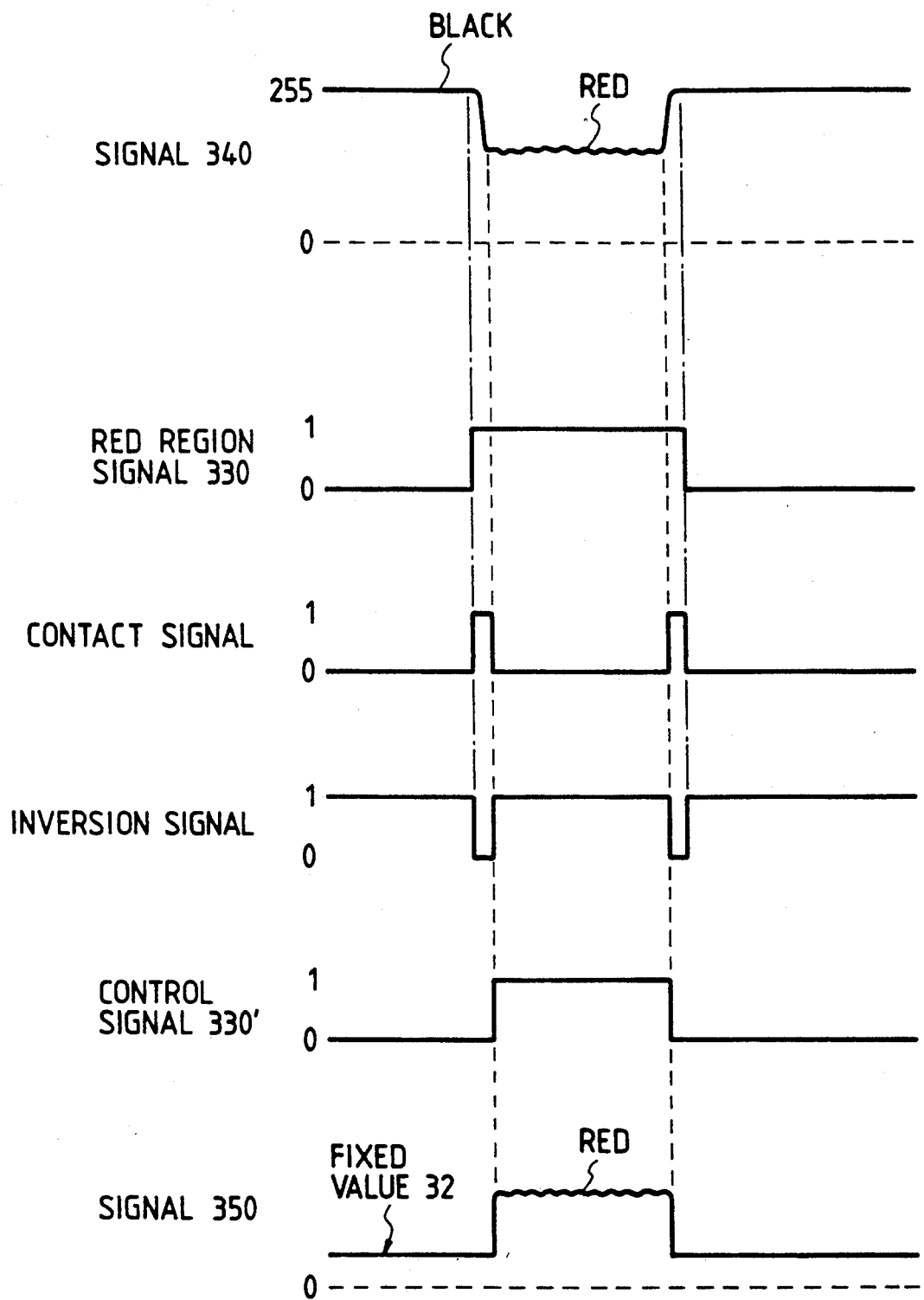

FIG. 27 illustrates how density information 340 is selected upon input of the control signal 330'.

If the red pedigree density information 340 is selected by the red region signal 330, black information may be mixed with the red region at the area where the black area changes to the red area, from the standpoint of the resolution of CCD. In view of this, in this embodiment, the control signal 330' to the selector 170 is generated using contact signals representative of the changes from black to red, and vice versa. In this manner, the signal 350 only for the red region can be correctly extracted.

This contact information can be extracted by interposing between the selector 160 and the selector 170 a circuit for detecting a transition of, for example, the red region signal from "0" to "1" or from "1" to "0".

Figure 28:
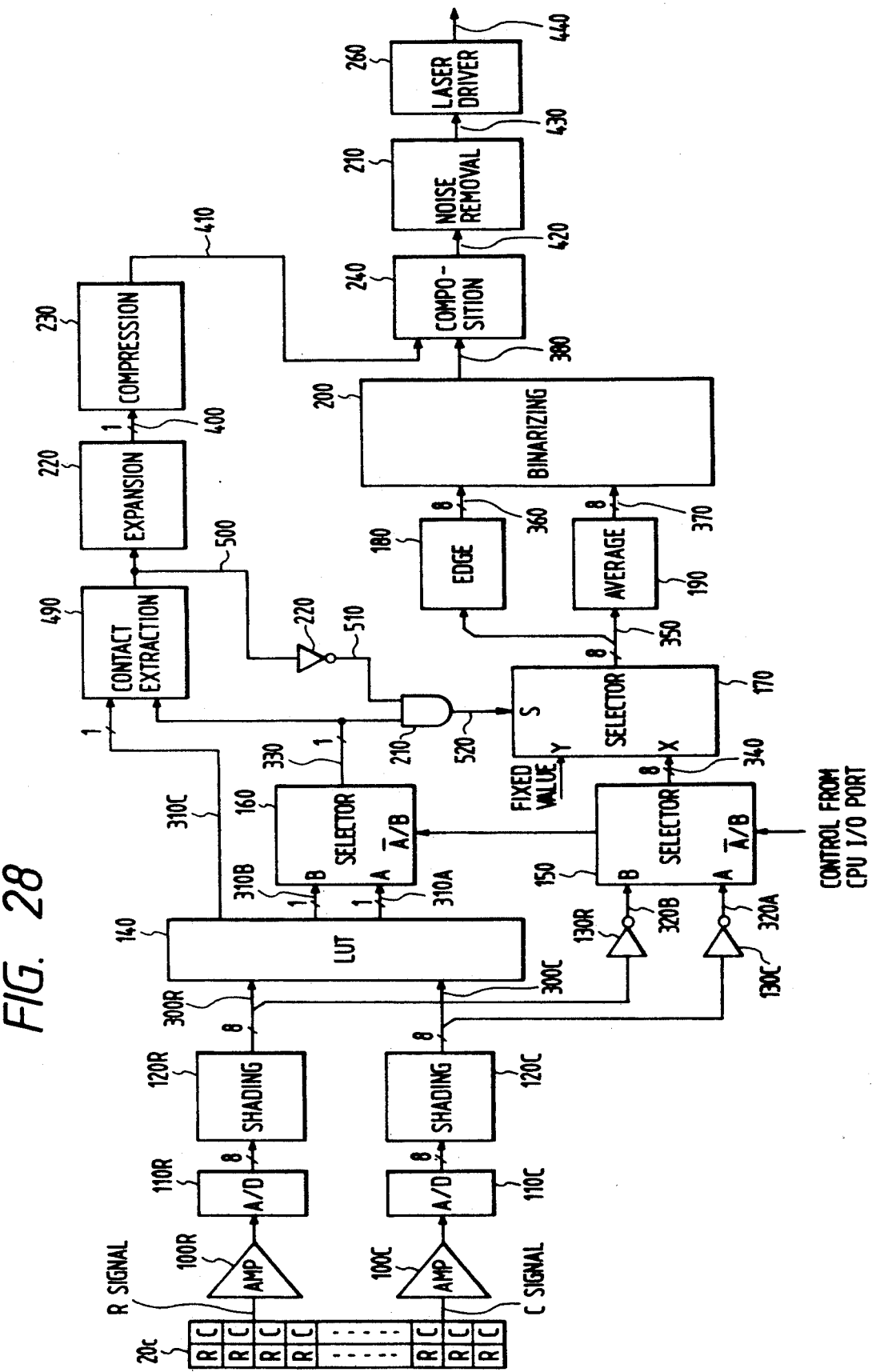

Alternatively, as the control signal 330' there may be selected a logical product of the red region signal 330 input to the control terminal S of the selector 170 and the inverted signal of a contact signal (contact information regarding the black decision signal 310C and red decision signal 310A) such as shown in FIGS. 26 and 27 (refer to FIG. 28).

The output signal 350 from the selector 170 is then input to the edge emphasizing circuit 180 and an averaging circuit 190.

The edge emphasizing circuit 180 is constructed of a known edge emphasizing filter, and emphasizes the edge of the input signal 350. The averaging circuit 190 averages the value of an object pixel of the input signal 350 using a 9×9 matrix. The output signals 360 and 370 outputted from the edge emphasizing circuit 180 and the averaging circuit 190 are input to the next stage binarizing circuit 200. The binarizing circuit 200 compares the 8 bit output signal 360 of the edge emphasizing circuit 180 with the 8 bit output signal 370 of the averaging circuit 190, and outputs a one bit red signal 380.

It is obvious that the size of the filter for edge emphasizing and smoothing is not limited to the above example.

In the above manner, the edge emphasized image is binarized using the average value as a threshold value. Therefore, even an image of a light color such as a yellow pedigree color can be binarized properly. In addition, blur and the like at the edge of an image likely to occur during binarization can be avoided.

Figure 14A:
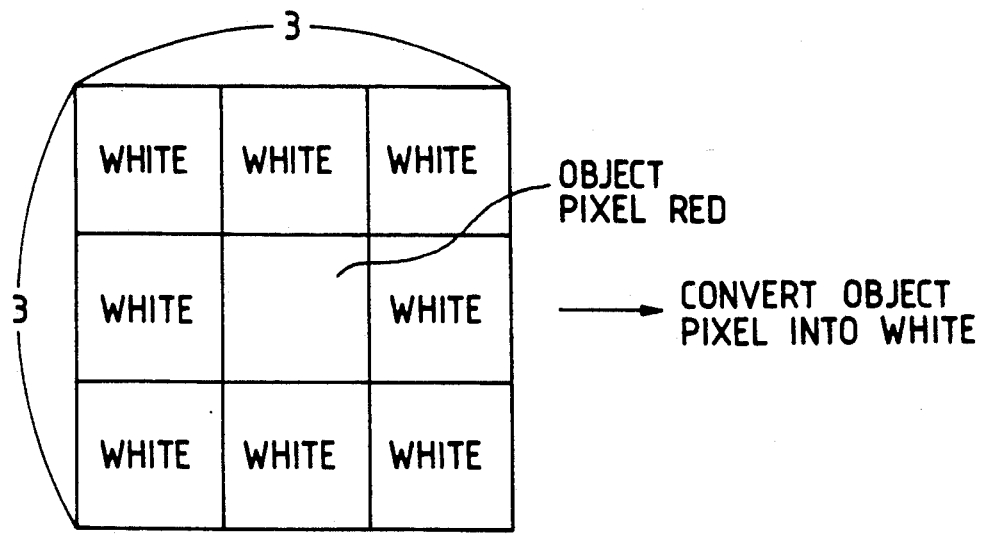
FIGS. 14A and 14B are diagrams used for explaining noise elimination or removal.
Figure 14B:
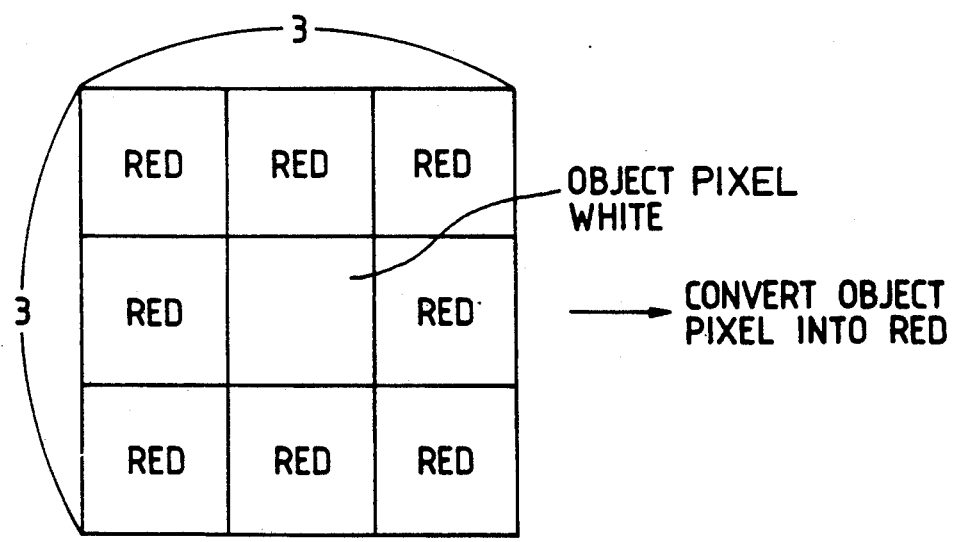

The red signal 380 binarized by the binarizing circuit 200 is input to the next stage noise removing circuit 210 to remove noises. This noise removing circuit 210 is constructed of a 3×3 filter such as shown in FIGS. 14A and 14B. The noise removing circuit removes noises by converting isolated red information within white information into white information, and converting isolated white information within red information into red information. The output signal 390 of the noise removing circuit is input to an expansion circuit 220 and a composition circuit 240.

The expansion circuit 220 has two functions, one for extracting a contact between the black and red information, and the other for expanding the extracted contact information. The expansion circuit receives the black information 310C directly from the binarizing circuit 200 and the noise removed red information 390. The contact extraction function will be first described with reference to FIGS. 15A to 15C.

Figure 15A:
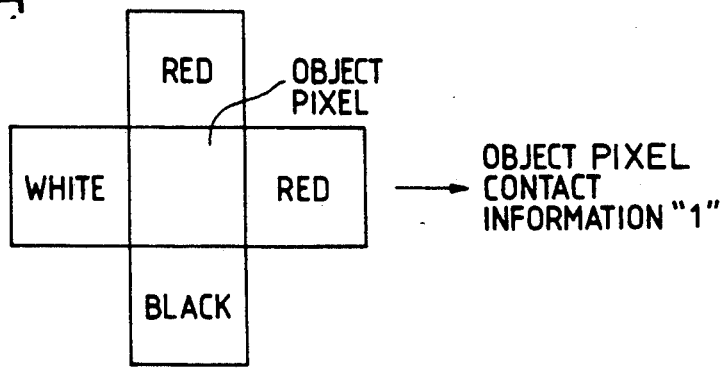
FIGS. 15A to 15C are diagrams showing expansion matrices.
Figure 15B:
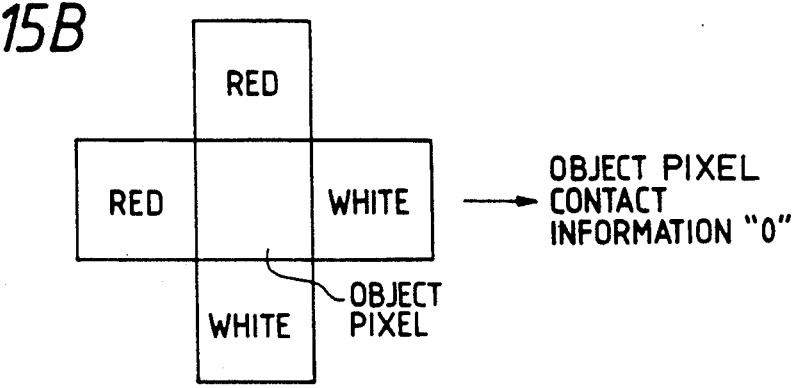
Figure 15C:
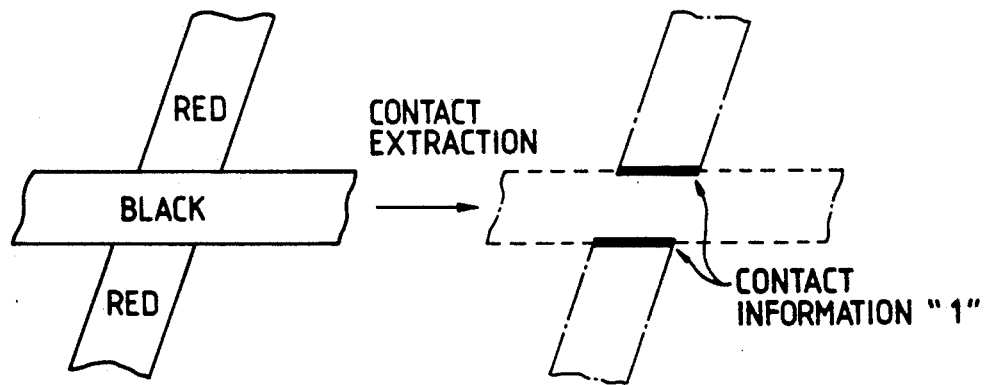

This contact extraction is carried out in the following manner. As shown in FIG. 15A, the contact information "1" is used for the object pixel if the adjacent four pixels within a 3×3 matrix contain both the red and black information. Alternatively, as shown in FIG. 15B, the contact information "0" is used for the object pixel if the adjacent four pixels do not contain both red and black information. FIG. 15C shows the contact information with the red and black information intersected.

The second function or expansion function of the expanding circuit will be described with reference to FIG. 16.

Figure 16A:
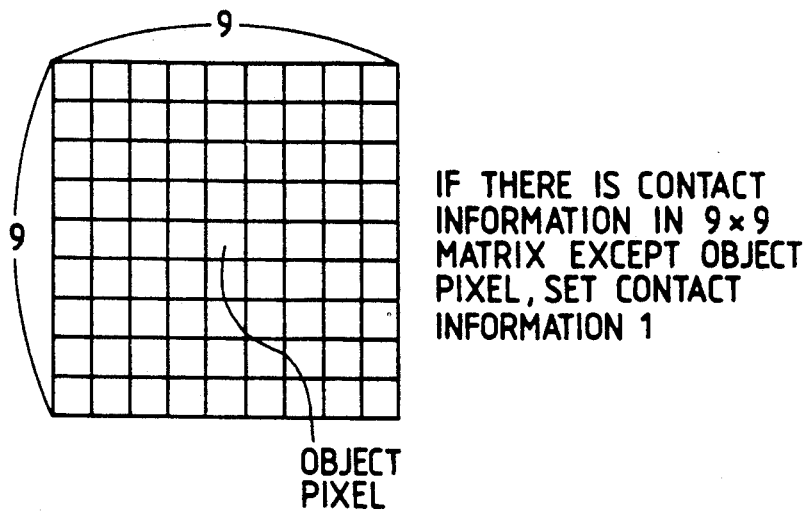
FIG. 16A shows an expansion matrix.
Figure 16B:
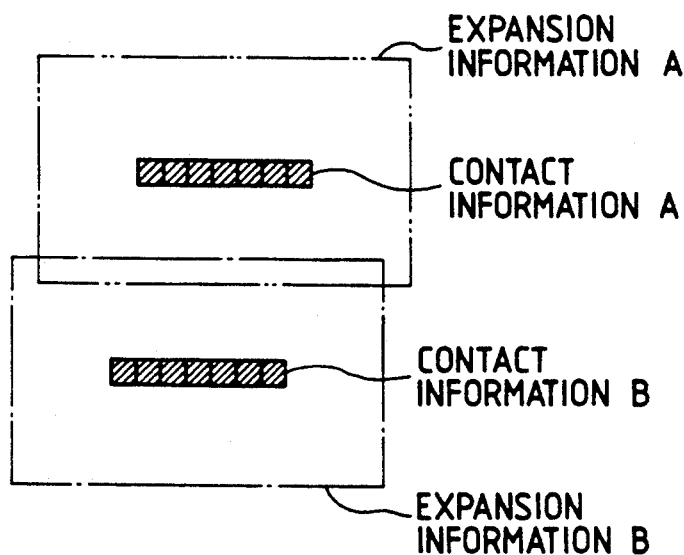
FIG. 16B is a diagram showing the relationship between contact information and expansion information.

FIG. 16A shows a fundamental matrix used for the expansion. As shown in FIG. 16A, this fundamental matrix has a size of 9×9. The contact information "1" is used for the objective pixel if there is contact information within the matrix except the objective pixel, and the contact information "0" is used if there is no contact information. FIG. 16B shows expansion information obtained by expanding two contact information A and B by using the matrix shown in FIG. 16A. In FIG. 16B, the expansion information A is obtained by expanding the contact information A and indicated by a two-dot-chain line. The expansion information B is obtained by expanding the contact information B and indicated by a one-dot-chain line. The size of the matrix used for the expansion is not limited to 9×9.

The expansion information A and B is inputted via a signal line 400 to the compression circuit 230 which has a 9×9 matrix (FIG. 16A) similar to the expansion circuit 220. The expansion information "1" is used for the object pixel if all the pixels within the matrix except the object pixel are expansion information, and otherwise the expansion information "0" is used. The size of the matrix used for the compression may be determined as equal to, larger or smaller than the expansion ratio. A set of "1" information is input as compression information via a signal line 410 to the composition circuit 240 to be composed with the signal 390 from the noise removing circuit 210.

The operation of the noise removing circuit 240 will be described with reference to FIG. 18.

Figure 18:
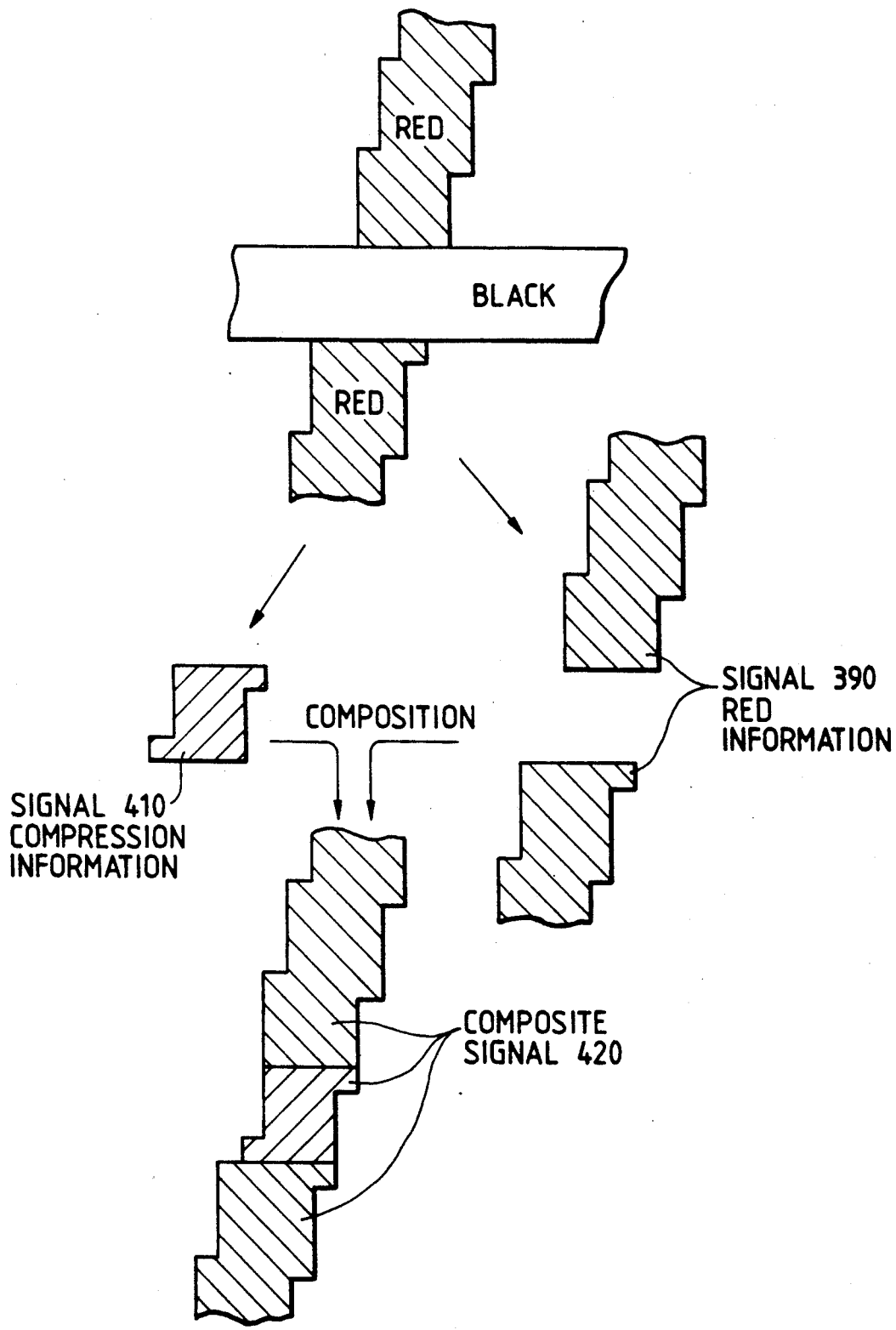
FIG. 18 is a diagram showing image composition.

As shown in FIG. 18, the composition circuit 240 composes the red information signal 390 separated from the red and black intersecting image with the compression information signal 410 from the compression circuit 230, and outputs a composite signal 420. Namely, by composing the red information signal 390 with the compression information signal 410, it becomes possible to interpolate a lack of red information caused by the red and black intersected image.

Accordingly, even if the position of a black latent image formed by the analog image recording system is displaced due to a poor mechanical precision from the position of a red latent image formed by the digital image recording system, it is possible to form an image which is not visually poor and which is faithful to the original image.

The output signal 420 of the composition circuit 240 is input to the next variable magnification circuit 250 which executes a predetermined variable magnitude process in accordance with an instruction from the operation unit 41. The output signal 430 of the variable magnification circuit 250 is input to the next stage laser driver 260 to be processed for driving the laser 26. The laser 26 converts the electrical signal from the laser driver 260 into light information which is reflected by the polygonal mirror 25a to form a red information latent image on the drum 11.

Thereafter, the red information latent image is developed with red toner, and the developed black image is transferred to and fixed on a cut sheet SH.

In the above manner, the image quality is prevented from being lowered by a duplicated image area or a blank image area.

The second embodiment of the image processing unit 2a will be described in detail.

Figure 22:
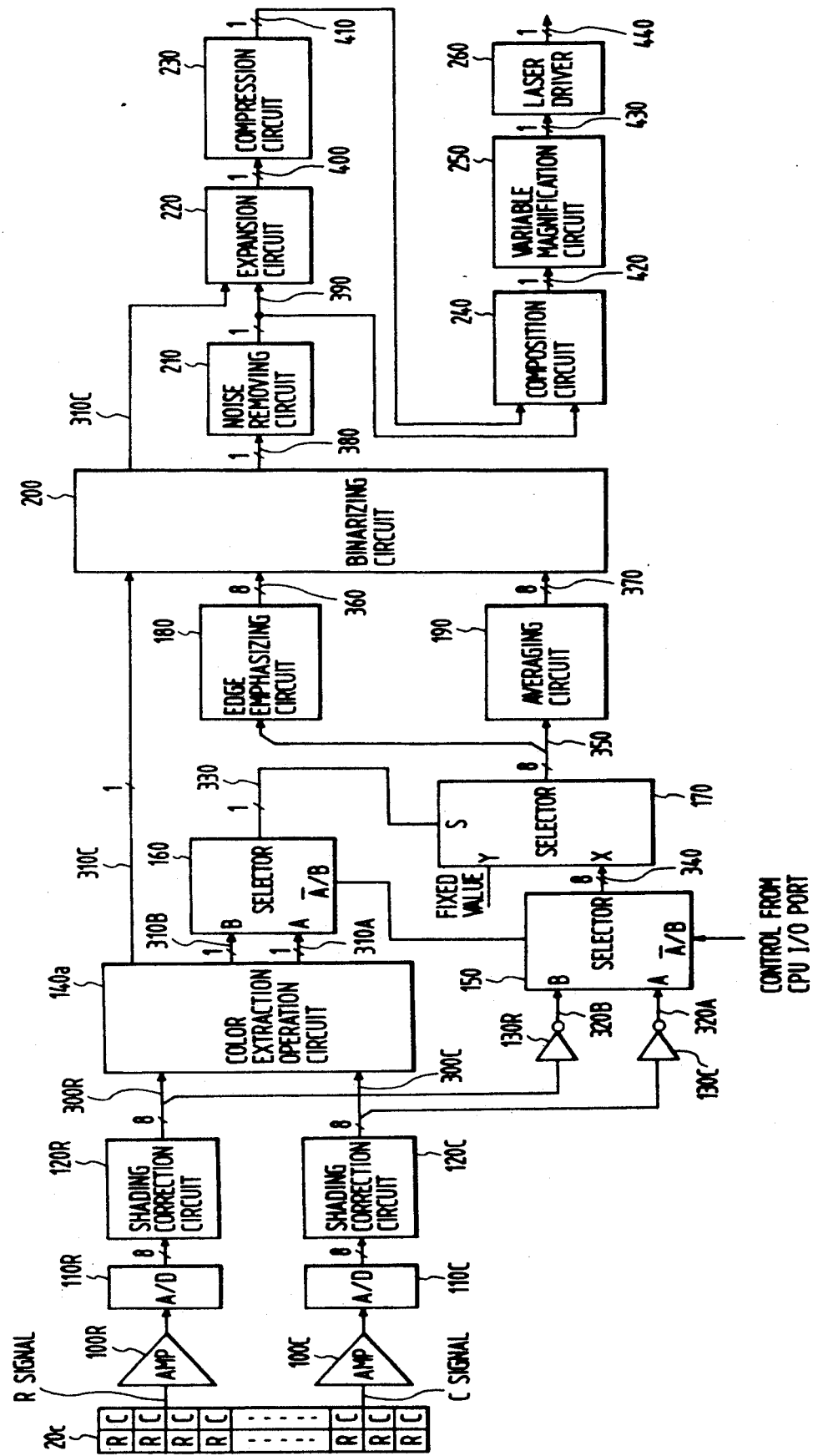
FIG. 22 is a block diagram showing the details of the image processing unit according to the second embodiment.

FIG. 22 is a block diagram showing the image processing unit 2a of the second embodiment. In FIG. 22, like elements to those of the first embodiment are represented by using identical reference numerals. A color extraction operation circuit 140a corresponding to the above-described look-up table 140 will be described.

Figure 23:
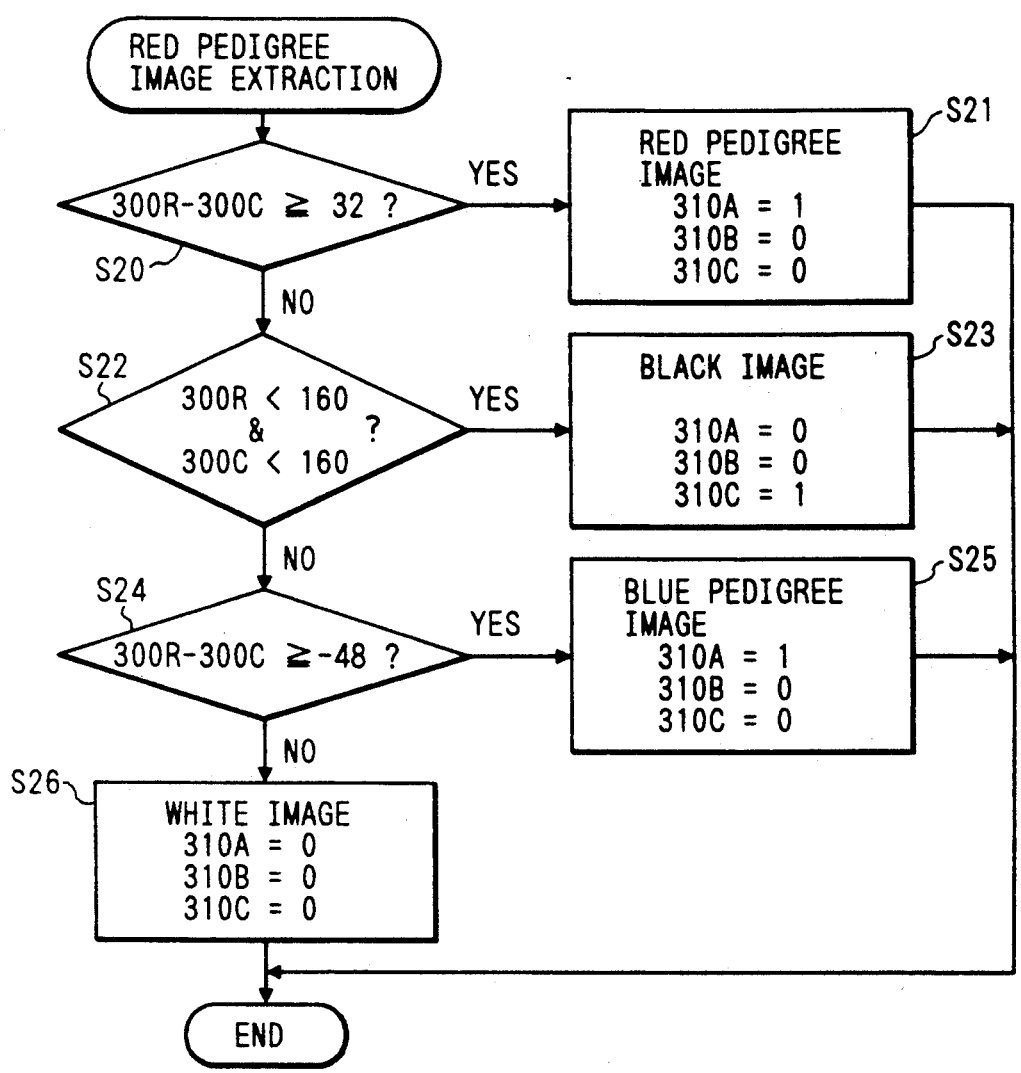
FIG. 23 is a flow chart showing image extraction according to the second embodiment.

The color extraction operation circuit 140a functions in the similar manner as of LUT 140 of the first embodiment. The circuit 140a receives signals 300R and 300C and outputs the red decision signal 310, blue (cyan) decision signal 310B, and black decision signal 310C. The processes executed by this color extraction operation circuit 140a will be described below with reference to the flow chart of FIG. 23 showing the operation of extracting the red pedigree color image.

In order to obtain approximately the same color distribution range (FIGS. 24 and 25) obtained when removing the red and blue pedigree colors by the red optical filter 20d, the following formula (1) is checked at step S20 using the red digital signal 300R and cyan digital signal 300C respectively of 256 tones:

$$300R - 300C \geq 32 \tag{1}$$

If affirmative, the pixel is judged as a red image, and "1" is output as the signal 310A. If negative, it is checked if the signals 300R and 300C are both smaller than "160". If affirmative, "1" is output as the signal 310C. If negative, the formula (2) is checked at step S24. If affirmative, "1" is output as the signal 310B as the red pedigree image signal.

$$300R - 300C \leq -48 \tag{2}$$

If negative, the pixel is judged as a white image (no image) at step S26, and "0" is output as the signals 310A, 310B and 310C.

With the operation of the selector 160, the color distribution shown in FIG. 24 is obtained for extracting the red pedigree color, and the color distribution shown in FIG. 25 is obtained for extracting the blue pedigree color. In this manner, the color distribution range approximately that obtained by an optical filter can be obtained through calculation.

As described above, according to the second embodiment, the color distribution range of removing a desired color is made consistent with the range of color being extracted, thereby obtaining a good image quality without a duplicated area or a blank area.

Another embodiment of this invention will be described in detail with reference to the accompanying drawings.

In this embodiment, a CPU is used for the operations by the circuit portion from the shading circuits 120R and 120C to the laser driver 260 of the image processing unit shown in FIG. 10. Like circuit elements to those of the above-described embodiments are represented by using identical reference numerals, and the description thereof is omitted.

Forming a latent image of a black image and developing it is the same as the above-described embodiments. Forming a latent image of a red image on the drum 11 will be described.

Prior to forming a latent image of a red image, the shutter 27 shown in FIG. 1 is closed. As the shutter 27 is closed, light from the exposure lamp 2c is not projected on the photosensitive drum 11. As the original exposure lamp 2c and scanning mirror are moved in the direction indicated by the arrow in FIG. 1 by the optical system driver motor 2f, light from the exposure lamp 2c is incident on an original 999 to scan it. The reflected light from the original 999 is transmitted through the half mirror 20a and focused by the lens 20b on the CCD line sensor 20c.

The R and C analog signals from the line sensor 20c are inputted to the controller unit 2a. The image processing by the controller unit 2a will be described with reference to FIG. 19.

Figure 19:
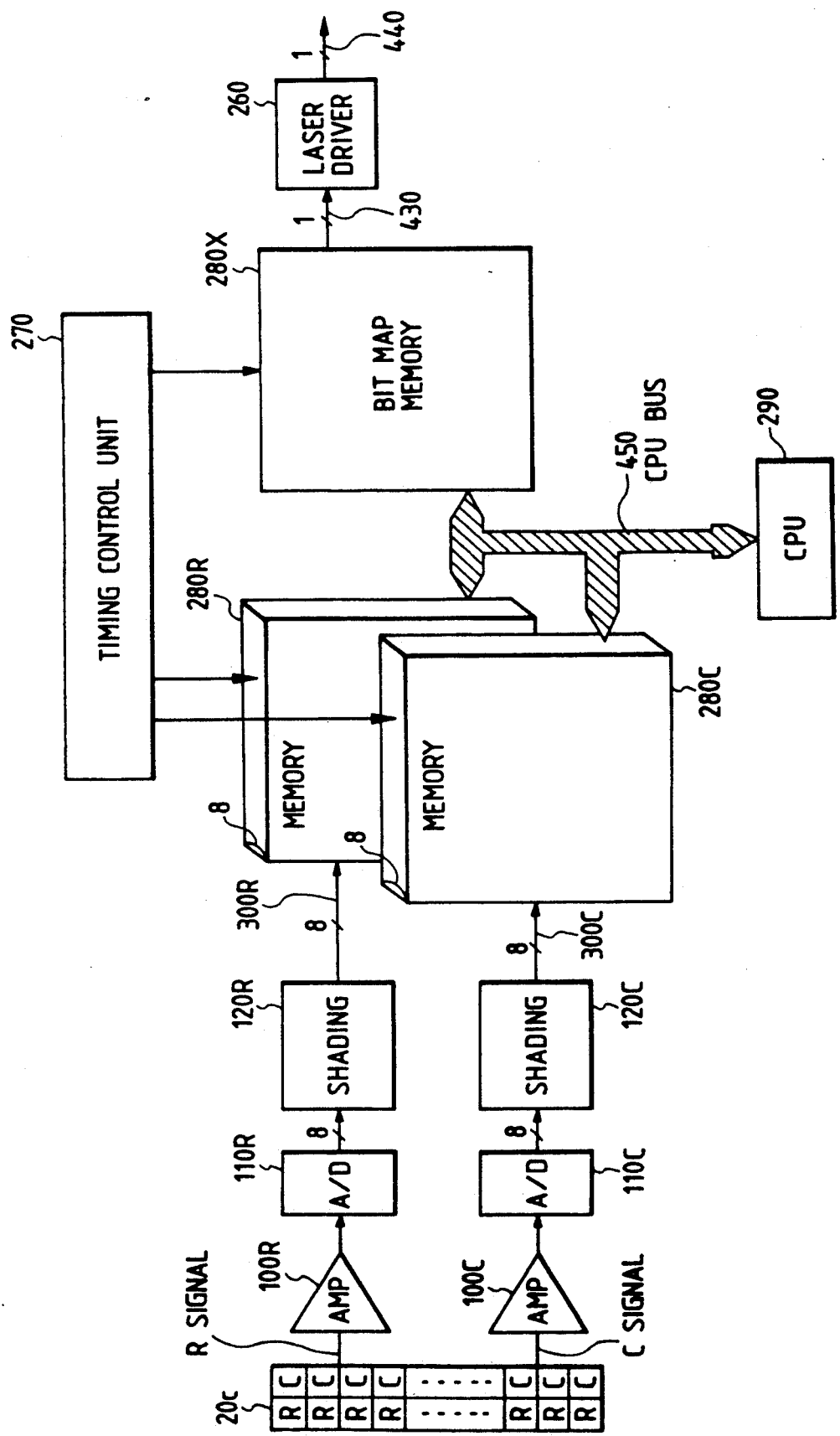
FIG. 19 is a block diagram showing the details of the image processing unit according to another embodiment.

As shown in FIG. 19, the R and C signals from the CCD line sensor 20c are input to the amplifiers 100R and 100C, respectively. The amplifiers 100R and 100C amplify the R and C signals respectively such that the outputs of the amplifiers when the CCD line sensor 20c reads a white plate (not shown) at the original scanning unit 2 correspond to the full scales of A/D converters 110R and 110C, respectively.

Next, the analog signals amplified by the amplifiers 100R and 100C are A/D converted into 8 bit digital information by the next stage A/D converters 110R and 110C, respectively. The outputs from the A/D converters 110R and 110C are input to the shading correction circuits 120R and 120C, respectively. The shading correction circuits 120R and 120C correct the sensitivity dispersion of the CCD line sensor 20c, the light amount dispersion of the original exposure lamp 2c, and the like. The outputs of the shading correction circuits 120R and 120C are stored in memories 280R and 280C, respectively.

In the embodiment, the memories 280R and 280C each have the capacity capable of storing one A3 screen data with 8 bits per pixel. The signals 300R and 300C are stored in the memories 280R and 280C, respectively, in synchronism with the timing signals from a timing control unit 270.

The processes by a CPU 290 via a CPU bus for operating the image data stored in the memories 280R and 280C will be described.

In this embodiment, red and black colors are separated.

Figure 20:
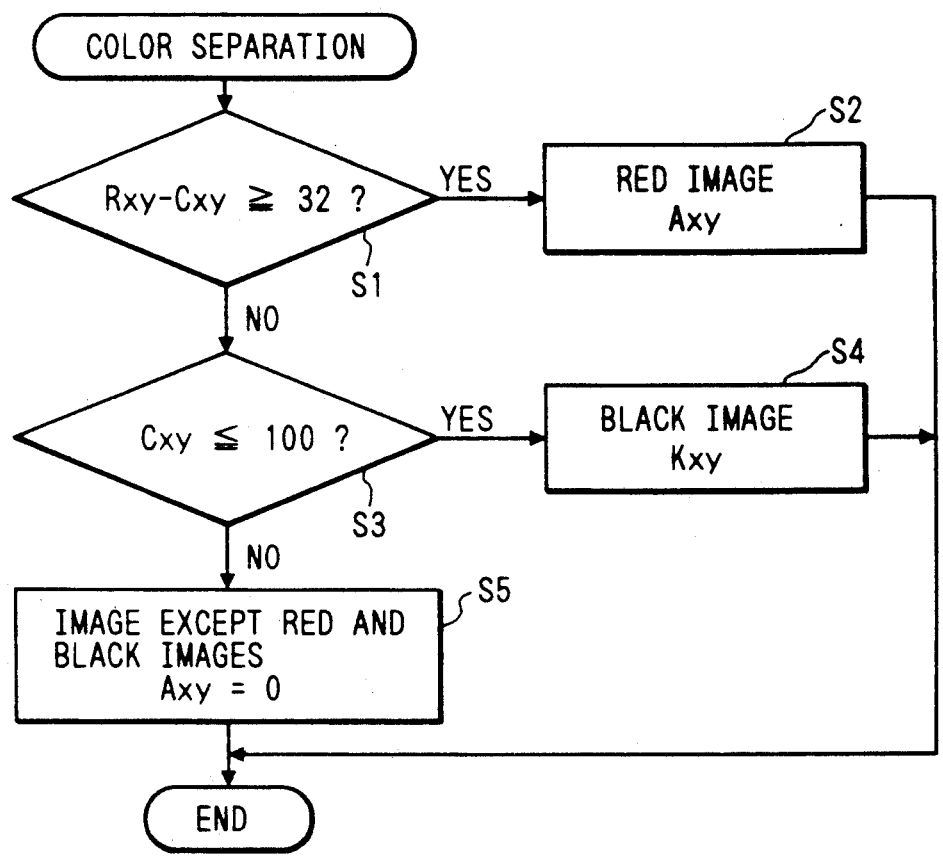
FIG. 20 is a flow chart showing color separation processing according to another embodiment.

The color separation will be described first with reference to the flow chart shown in FIG. 20.

If a formula (3) is satisfied, the separated color is judged as a red color (affirmative at step S1).

$$Rxy - Cxy \geq 32 \qquad (3)$$

where $0 \geq Rxy$, $Cxy \leq 255$, and Rxy and Cxy represent image information stored in the memories 280R and 280C at a pixel position (x, y).

The image Axy judged as the red image is obtained from a formula (4) (step S2).

$$Axy = 255 - Cxy \qquad (4)$$

If the image is not a red image and a formula (5) is satisfied, it is judged as a black image (affirmative at step S3).

$$Cxy \leq 100 \qquad (5)$$

The image judged as the black image is represented by Kxy (step S4), and if the image is neither the red nor black image, Axy is set to 0 (step S5).

Figure 21:
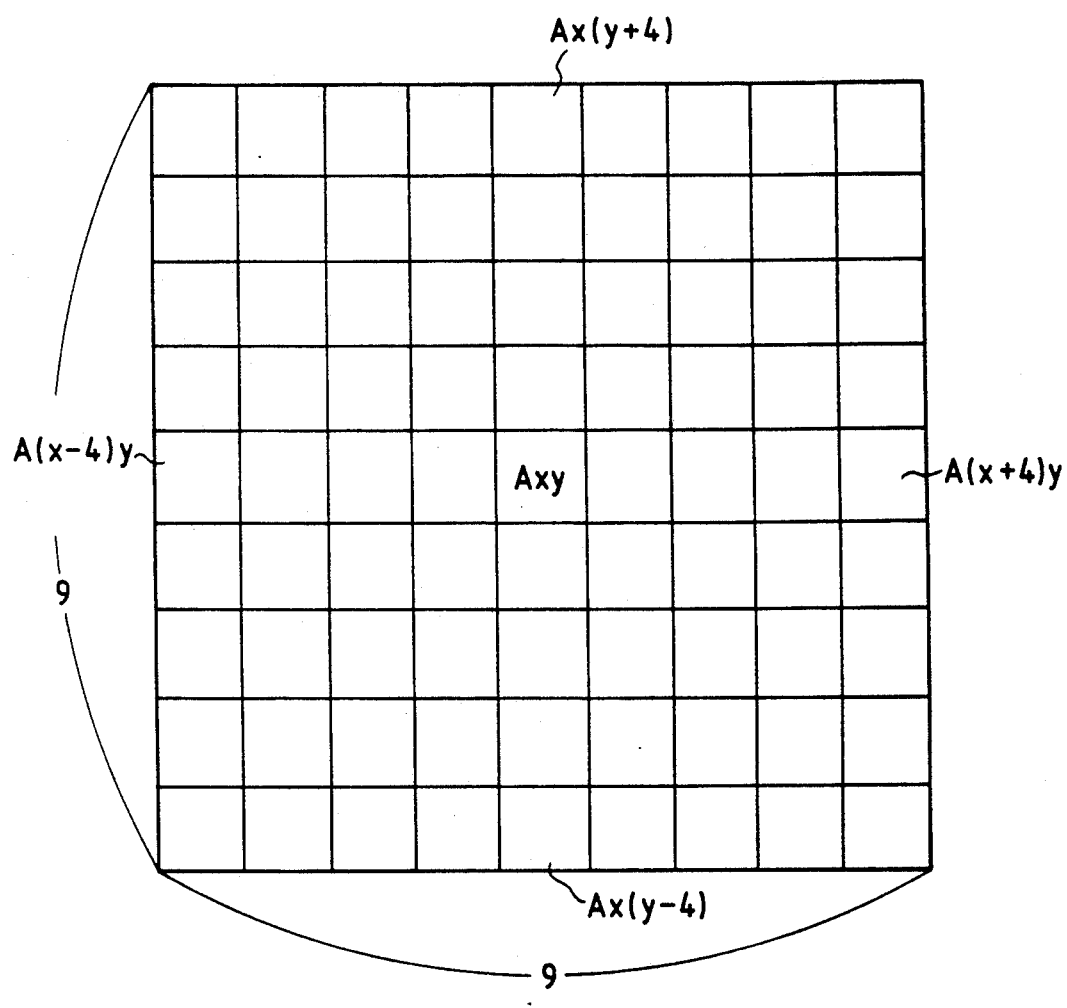
FIG. 21 is a diagram showing a filter for edge emphasizing processing according to another embodiment.

The red image Axy is then edge-emphasized. This edge emphasizing is carried out using a 9×9 filter such as shown in FIG. 21.

The edge emphasized image Exy is obtained from a formula (6).

$$Exy = Axy + \alpha(4Axy - A_{(x-4)y} - A_{(x+4)y} - A_{x(y-4)} - A_{x(y+4)}) \qquad (6)$$

where $\alpha(\geq 0)$ is a coefficient representative of the strength of an edge.

The red image Axy is subjected to the averaging processing. This averaging processing is carried out for the 9×9 area using the similar operation as the first embodiment.

The averaged image Sxy is calculated using the following formula (7).

$$Sxy = \frac{1}{81} \sum_{k=-4}^{k=4} \sum_{l=-4}^{l=4} A_{(x+k)(y+l)} \qquad (7)$$

Using the edge emphasized image Exy and the averaged image Sxy, the binarization operation is performed.

The binarization result Bxy is set to 1 if Exy>Sxy, and set to 0 if Exy≤Sxy, to binarize the red image.

Two types of noise removal are carried out using the 3×3 filters shown in FIGS. 14A and 14B.

As shown in FIG. 14A, Bxy is set to "0" if the object pixel Bxy is "1" and the adjacent eight pixels are all "0", i.e., white image.

Also as shown in FIG. 14B, Bxy is set to "1" if the object pixel is "0" and the adjacent eight pixels are all "1", i.e., red image.

The expansion processing includes a contact extraction process for detecting a contact area between black information and red information, and a expansion process for expanding the extracted contact. In the contact extraction process, as shown in FIG. 15A, the contact image Txy is set to "1" if red image information (Bxy=1) and black image information (Kxy=1) are contained within the 3×3 matrix around the object pixel.

The other expansion process is a process for expanding Txy. This process is the same as the above-described embodiments. The object image is set to "1" if the contact image Txy is contained in the 9×9 matrix shown in FIG. 16A. The images Uxy expanded from the contact image Txy are indicated by the one-dot-chain line and two-dot-chain line in FIG. 16B.

The compression processing of this embodiment is a process for compressing the expanded image Uxy.

Figure 17:
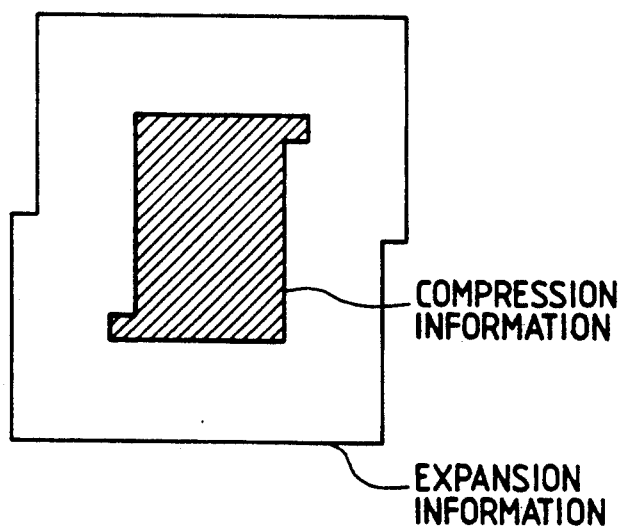
FIG. 17 is a diagram showing image expansion and compression.

In the compression process, as shown in FIG. 17, if the eighty adjacent pixels within the 9×9 matrix are all the expanded image Uxy, the object image is set to "1" to obtain the compressed image Dxy (hatched area).

The composition process composes the compressed image obtained by the compression process with the red image Bxy with noises removed. The result is shown in FIG. 18 similar to the above-described embodiment.

The variable magnification process magnifies the composed information obtained by the composition process at a magnification designated by the operation unit 41.

The above-described processes are executed by the CPU 290. The variable magnification result is stored in a bit map memory 280 X shown in FIG. 19. The information stored in the bit map memory 280 X is read with the help of the timing control unit 270, and supplied to a laser driver 260 via a signal line 430.

The laser driver 260 activates the laser 26 which converts an electrical signal from the laser driver 260 into light information. The light information is applied to the rotary polygonal mirror 25a so that the reflected light is incident to the drum 11 to form a latent image of the red image.

The red image is developed in the same manner as the above-described embodiments, so the description thereof is omitted.

As described above, various operations for forming a latent image of a red image can be performed by the CPU 290, allowing a red and black two color copy with a simple arrangement.

The present invention is not limited to the above-described embodiments, but various modifications are possible.

We claim:

1. An image forming apparatus comprising:
an exposure unit for exposing an original;
a first image forming unit for forming an image on a recording medium by removing an image of a predetermined color component from an original image exposed by said exposure unit;
a second image forming unit for forming an image on said recording medium by extracting an image of said predetermined color component from said original image exposed by said exposure unit; and
processing means for making the color distribution range of said predetermined color component to be removed by said first image forming unit consistent with the color distribution range of said predetermined color component to be extracted by said second image forming unit.

2. An image forming apparatus according to claim 1, further comprising means for composing an image formed by said first image forming unit with an image formed by said second image forming unit.

3. An image forming apparatus according to claim 1, wherein said processing means includes a memory for storing data which determines the color distribution range.

4. An image forming apparatus according to claim 1, wherein said first image forming unit forms an image with a color different from a color of an image formed by said second image forming unit.

5. An image forming apparatus comprising:
an exposure unit for exposing an original;
a first image forming unit for forming an image on a recording medium by removing an image of first color components from an original image exposed by said exposure unit; and
a second image forming unit for forming an image on said recording medium by extracting an image of said first color components from said original image exposed by said exposure unit,
wherein said second image forming unit comprises means for reading said original image and generating an image signal for said first color components and an image signal for second color components, and means for determining if the read-out image is said image of said first color components, in accordance with the density of said image signal of said second color components, and
said determining means making the color distribution range of said first color components to be removed by said first image forming unit consistent with the color distribution range of said first color components to be extracted by said second image forming unit.

6. An image forming apparatus according to claim 5, further comprising means for composing an image formed by said first image forming unit with an image formed by said second image forming unit.

7. An image forming apparatus according to claim 5, wherein said determining means includes a memory for storing data which determines the color distribution range.

8. An image forming apparatus according to claim 5, wherein said first image forming unit forms an image with a color different from a color of an image formed by said second image forming unit.

9. An image forming apparatus comprising:
an exposure unit for exposing an original;
a first image forming unit for optically forming an image on a recording medium by removing an image of a predetermined color component from an original image exposed by said exposure unit;
a second image forming unit for photoelectrically reading said original image exposed by said exposure unit and forming an image on the recording medium by extracting an image of said predetermined color component from said original image at a timing different from a timing of image forming by said first image forming unit; and
transfer means for transferring the image formed on the recording medium by said first image forming unit and the image formed on the recording medium by said second image forming unit onto one sheet at different timings respectively.

10. An image forming apparatus according to claim 9, further comprising means for composing an image formed by said first image forming unit with an image formed by said second image forming unit.

11. An image forming apparatus according to claim 9, wherein said first image forming unit includes an optical unit for projecting to said recording medium a light reflected from said original exposed by said exposure unit, and a filter mounted on an optical path of said reflected light for passing said predetermined color components.

12. An image forming apparatus according to claim 9, wherein said first image forming unit forms an image with a color different from a color of an image formed by said second image forming unit.

13. An image forming apparatus according to claim 9, wherein said exposure unit exposes and scans the original a plurality of times, one of a plurality of exposures and scannings by said exposure unit being performed to form an image by said first image forming unit and another one of the plurality of exposures and scannings being performed to form an image of the original by said second image forming unit.

14. An image forming apparatus comprising:

an exposure unit for exposing an original;
a filter for passing predetermined color components of reflected light reflected from the original exposed by said exposure unit;
a first image forming means for forming an image of a first color on a photosensitive medium on the basis of the light which passes through said filter;
an image sensor for photoelectrically reading out an image of the original exposed by said exposure unit;
output means for outputting an image signal corresponding to the image of said predetermined color components from the image read out by said image sensor;
a second image forming means for forming an image of a second color on the photosensitive medium on the basis of the image signal output from said output means;
synthesizing means for synthesizing the image formed by said first image forming means and the image formed by said second image forming means to record a synthesized image on a sheet; and
stopping means for stopping application of light from said exposure unit to the photosensitive medium during an image forming operation by said second image forming means.

15. An image forming apparatus according to claim 14, wherein said first image forming means has an optical system which projects the light passing through said filter on the photosensitive medium.

16. An image forming apparatus according to claim 14, wherein said second image forming means has light irradiation means for irradiating light corresponding to the image signal output by said output means on the photosensitive medium.

17. An image forming apparatus according to claim 14, wherein said output means has means for making a color distribution of extracted color components equal to a color distribution of the color components passing through said filter.

18. An image forming apparatus according to claim 14, wherein said stopping means comprises a shading member inserted into an irradiation path from the original to the photosensitive medium of the light reflected by the original.

* * * * *